(12) United States Patent  
Warren

(10) Patent No.: US 11,266,246 B2  
(45) Date of Patent: Mar. 8, 2022

(54) FURNITURE AND METHOD FOR ASSEMBLING FURNITURE

(71) Applicant: Telescope Casual Furniture, Inc., Granville, NY (US)

(72) Inventor: Jacob S. Warren, Granville, NY (US)

(73) Assignee: TELESCOPE CASUAL FURNITURE, INC., Granville, NY (US)

( * ) Notice: Subject to any disclaimer, the term of this patent is extended or adjusted under 35 U.S.C. 154(b) by 0 days.

(21) Appl. No.: 17/229,402

(22) Filed: Apr. 13, 2021

(65) Prior Publication Data

US 2021/0259422 A1    Aug. 26, 2021

Related U.S. Application Data

(63) Continuation-in-part of application No. 16/431,380, filed on Jun. 4, 2019, now Pat. No. 10,973,329.

(60) Provisional application No. 62/680,168, filed on Jun. 4, 2018.

(51) Int. Cl.
*A47C 4/03* (2006.01)
*A47C 4/02* (2006.01)

(52) U.S. Cl.
CPC ............... *A47C 4/03* (2013.01); *A47C 4/021* (2013.01)

(58) Field of Classification Search
CPC .. A47C 4/03; A47C 4/021; A47C 7/16; F16B 12/125; F16B 12/26
See application file for complete search history.

(56) References Cited

U.S. PATENT DOCUMENTS

| 151,873 A | 6/1874 | Grant |
| 164,248 A | 6/1875 | Andrews |
| 198,922 A | 1/1878 | June |
| 222,190 A | 12/1879 | Jackson |
| 222,403 A | 12/1879 | How |

(Continued)

FOREIGN PATENT DOCUMENTS

| CH | 422252 A | 5/1965 |
| DE | 3305565 A1 | 10/1984 |

(Continued)

OTHER PUBLICATIONS

Jacob S. Warren and Sarah Warren, Utility Design U.S. Appl. No. 29/693,652, filed Jun. 4, 2019 Jun. 4, 2019.

(Continued)

*Primary Examiner* — Milton Nelson, Jr.
(74) *Attorney, Agent, or Firm* — Heslin Rothenberg Farley & Mesiti P.C.

(57) ABSTRACT

An article of furniture includes a seat frame, first and second spaced apart seat connectors, a plurality of elongated seat panels, first and second spaced apart back post connectors, and a plurality of elongated back panels. The seat connectors and the back connectors include an upper bulbous member and a body. The panels include first and second spaced apart channels therein with cutouts extending from the channels and opening onto a surface of the seat panels. The channels of the seat panels are receivable on the upper bulbous members of the spaced apart seat connectors to form a seat, and the channels of the back panels are receivable on the front bulbous members of the spaced apart back connectors to form a back.

23 Claims, 27 Drawing Sheets

(56) References Cited

U.S. PATENT DOCUMENTS

| | | | |
|---|---|---|---|
| 329,201 A | 10/1885 | Munger | |
| 451,776 A | 5/1891 | Sauder | |
| 945,510 A | 1/1910 | Fullan | |
| 1,125,359 A | 1/1915 | McDowell | |
| 1,167,155 A * | 1/1916 | Derby | F16B 7/22 403/331 |
| D183,887 S | 11/1958 | Jensen | |
| 2,955,646 A | 10/1960 | Briggs | |
| 3,003,817 A | 10/1961 | King | |
| 3,054,643 A | 9/1962 | Militano | |
| D193,843 S | 10/1962 | Ohlsson | |
| 3,205,008 A | 9/1965 | Murray et al. | |
| 3,230,012 A | 1/1966 | Beckman et al. | |
| D223,494 S | 4/1972 | Fleming | |
| 3,674,068 A | 7/1972 | Lucci | |
| 4,302,048 A | 11/1981 | Yount | |
| 4,318,570 A | 3/1982 | Adam et al. | |
| 4,395,071 A | 7/1983 | Laird | |
| 5,112,110 A | 5/1992 | Perkins | |
| D332,355 S | 1/1993 | Maruya et al. | |
| 5,509,720 A | 4/1996 | Croom | |
| 5,762,440 A | 6/1998 | Bedouch | |
| 5,769,500 A | 6/1998 | Holbrook | |
| 6,779,849 B1 | 8/2004 | Harper et al. | |
| 7,140,689 B2 | 11/2006 | Zheng | |
| D648,557 S | 11/2011 | Frinier | |
| 8,087,730 B2 | 1/2012 | Leng | |
| 8,511,753 B2 | 8/2013 | Huang | |
| 8,528,979 B2 | 9/2013 | College | |
| D690,952 S | 10/2013 | Becker | |
| D708,452 S | 7/2014 | Garcia | |
| 8,931,849 B2 | 1/2015 | Kusch et al. | |
| 9,161,629 B2 | 10/2015 | Huang | |
| 9,265,350 B2 | 2/2016 | Davotian | |
| D792,121 S | 7/2017 | Pedersen | |
| D802,958 S | 11/2017 | Lowsky | |
| 9,810,253 B2 | 11/2017 | Koelling et al. | |
| D805,316 S | 12/2017 | Lowsky | |
| D814,821 S | 4/2018 | Velez | |
| D848,172 S | 5/2019 | Tham et al. | |
| D865,425 S | 11/2019 | Snowden | |
| 10,973,329 B2 | 4/2021 | Warren | |
| D927,216 S | 8/2021 | Warren et al. | |
| 2014/0270932 A1 | 9/2014 | Tseng | |
| 2017/0164745 A1 | 6/2017 | Huang | |

FOREIGN PATENT DOCUMENTS

| | | | |
|---|---|---|---|
| DE | 29511436 | 11/1995 | |
| FR | 799576 A | 6/1936 | |
| FR | 1097948 | 7/1955 | |
| FR | 2433322 A1 * | 3/1980 | A47C 4/03 |
| FR | 2574876 A1 | 6/1986 | |
| FR | 3010749 B1 | 4/2016 | |

OTHER PUBLICATIONS

Jacob S. Warren and Sarah Warren, Design U.S. Appl. No. 29/692,098, filed May 22, 2019 May 22, 2019.

Hudson Chair, available from Telescope Casual Furniture, Granville, New York, 2019 Telescope Casual Furniture Catalog cover page, pp. 30-33, and rear page Jul. 1, 2018.

Wexler Collection, designed by Jacob Warren and Sarah Warren, available from Telescope Casual Furniture, Granville, New York, 2019 Telescope Casual Furniture Catalog cover page, pp. 10-13, and rear page, Jul. 1, 2018.

Arcadia Chair, available from Rejuventation, Portland, Oregon, Kalie Eyman, "5 Ways to Prep Your Home for Spring" printout available on Jun. 3, 2019, at https://ideas.rejuventation.com/prep-for-spring/, 7 pages, Mar. 15, 2019.

Adirondack MGP Chair, available from Telescope Casual Furniture, Granville, New York, 2016 Telescope Casual Furniture Catalog cover page, p. 22, p. 23, and rear page, Jul. 1, 2015.

Telescope Casual 2016 Catalog, Telescope Casual Furniture, Inc., Granville, New York, 100 pages, Jul. 1, 2015.

Telescope Casual 2017 Catalog, Telescope Casual Furniture, Inc., Granville, New York, 100 pages, Jul. 1, 2016.

Telescope Casual 2018 Catalog, Telescope Casual Furniture, Inc., Granville, New York, 100 pages, Jul. 1, 2017.

Telescope Casual 2019 Catalog, Telescope Casual Furniture, Inc., Granville, New York, 100 pages, Jul. 1, 2018.

Hampton Marine Grade Polymer Outdoor Furniture, available from Windward Design Group, Sarasota, Florida, 6-pages, Sep. 28, 2012.

Adirondack MGP Sling, available from Telescope Casual Furniture, Granville, New York, 2016 Telescope Casual Furniture Catalog cover page, p. 40, p. 41, and rear page, Jul. 1, 2015.

Windward Deep Seat Collection, available from Telescope Casual Furniture, Granville, New York, 2010 Telescope Casual Furniture Catalog cover page, pp. 2-5, and rear page, Jul. 1, 2009.

Windward Sling Collection, available from Telescope Casual Furniture, Granville, New York, 2010 Telescope Casual Furniture Catalog cover page, pp. 29-30, and rear page, Jul. 1, 2009.

Kingston Solid MGP Dining Chair, available from Windward Design Group, Sarasota, Florida, (Wayback Verification Crawl presence date Apr. 28, 2017, https://web.archive.org/web/20170428035343/http://www.windwarddesigngroup.com/). 6 pages, Apr. 28, 2017.

* cited by examiner

FURNITURE AND METHOD FOR ASSEMBLING FURNITURE

CROSS-REFERENCE TO RELATED APPLICATION

This application is a continuation-in-part of U.S. patent application Ser. No. 16/431,380, filed Jun. 4, 2019, entitled "Furniture And Method For Assembling Furniture," which application claims the benefit of U.S. Provisional Application No. 62/680,168, filed Jun. 4, 2018, entitled "Furniture And Method For Assembling Furniture", which applications are hereby incorporated herein by reference in their entirety.

FIELD OF THE DISCLOSURE

The present disclosure relates generally to indoor or outdoor furniture and, in particular, to an improved assembly of rigid seat portions and rigid back portions to side portions of a seat frame and side portions of back posts.

BACKGROUND

Typically, some outdoor furniture such as chairs and lounges have been constructed of wood frames with a wood seat and a wood back rest that are assembled to the wood frame with screws.

SUMMARY

Shortcomings of the prior art are overcome and additional advantages are provided by the present disclosure, in which in one embodiment includes an article of furniture having a seat frame, first and second spaced apart seat connectors, a plurality of elongated seat panels, first and second spaced apart back post connectors, and a plurality of elongated back panels. The first and second spaced apart seat connectors include an upper bulbous member and a body. The body of the seat connectors is operably connected to the seat frame and extends along a left side and a right side of the seat frame. Each of the elongated seat panels includes first and second spaced apart channels therein with cutouts extending from the channels and opening onto a bottom surface of the seat panels. The cutouts have a width less than a width of the channel so that the channels of the elongated seat panels are receivable on the upper bulbous members of the spaced apart seat connectors and so that the plurality of seat panels form a seat. Each of the back connectors has a front bulbous member and a body. Lower portions of the back post connectors are operably connected to the seat frame extending upwardly from the left side and the right side of the seat frame. Each of the elongated back panels has first and second spaced apart channels therein and a cutout extending from the channels and opening onto a rear surface of the back panels. The cutouts having a width less than a width of the channel. The channels of the elongated back panels are receivable on the front bulbous members of the spaced apart back post connectors so that the plurality of back panels form a back.

In another embodiment, an article of furniture includes, for example, a seat frame, first and second spaced apart seat connectors, a plurality of elongated seat panels, first and second spaced apart back post connectors, and a plurality of elongated back panels. The seat frame has a left side and a right side defining vertically-disposed inner surfaces. Each of the seat connectors have an upper hollow bulbous member supported by a hollow body. The hollow body of the seat connectors is operably connected to the seat frame and extends along the left side and the right side of the seat frame. Each of the elongated seat panels has first and second spaced apart channels therein with cutouts extending from the channels and opening onto a bottom surface of the seat panels. The cutouts have a width less than a width of the channel, and the channels of the elongated seat panels are slidably receivable on the upper bulbous members of the spaced apart seat connectors so that the plurality of seat panels form a seat with a bottom surface of the seat panel spaced apart from a top surface of the body of the first and second spaced apart seat connectors. Each of the back connectors has a front hollow bulbous member supported by a hollow body. Lower portions of the back post connectors are operably connected to the seat frame extending upwardly from the left side and the right side of the seat frame. Each of the elongated back panels has first and second spaced apart channels therein and a cutout extending from the channels and opening onto a rear surface of the back panels. The cutouts having a width less than a width of the channel. The channels of the elongated back panels are slidably receivable on the front bulbous members of the spaced apart back post connectors so that the plurality of back panels form a back with a rear surface of the back panel spaced apart from a front surface of the body of the first and second spaced apart back post connectors.

In another embodiment, a method for forming an article of furniture includes, for example, providing a seat frame having a left side and a right side defining vertically-disposed inner surfaces, providing first and second seat connectors having an upper bulbous member and a body, operably attaching the body of the first and second seat connectors to the vertically-disposed inner surfaces of the left side and the right side of the seat frame, providing first and second back post connectors having a front bulbous member and a body, operably attaching lower portions of the body of the first and second back post connectors to the vertically-disposed inner surfaces of the left side and the right side of the seat frame, slidably attaching a plurality of seat panels to the upper bulbous members of the first and second seat connectors, and slidably attaching a plurality of back panels to the front bulbous member of the first and second back post connectors.

In another embodiment, an article of furniture may include a seat frame, a pair of spaced apart seat connectors, a plurality of elongated seat panels, a pair of spaced apart back post connectors, and a plurality of elongated back panels. Each of the seat connectors includes an upper bulbous member, a lower bulbous member, and a web disposed therebetween. The seat connectors operably connect to the seat frame and extend along a left side and a right side of the seat frame. Each of the elongated seat panels includes first and second spaced apart channels therein with cutouts extending from the channels and opening onto a bottom surface of the seat panels. The cutouts have a width less than a width of the channel, and the channels of the elongated seat panels are receivable on the upper bulbous members of the spaced apart seat connectors so that the plurality of seat panels form a seat. Each of the back connectors includes a front bulbous member, a rear bulbous member, and a web disposed therebetween. Lower portions of the back post connectors operably connect to the seat frame extending upwardly from the left side and the right side of the seat frame. Each of the elongated back panels includes first and second spaced apart channels therein and a cutout extending from the channels and opening onto a rear surface of the back panels. The cutouts have a width less than a width of the channel, and wherein the channels of the elongated back panels are receivable on the front bulbous members of the spaced apart back post connectors so that the plurality of back panels form a back.

In another embodiment, an article of furniture includes a seat frame, a seat operably attached to the seat frame, first and second back post connectors, and a plurality of elongated back panels. Each of the back connectors includes a front bulbous member, a rear bulbous member, and a web disposed therebetween. A first side of the seat frame has a pair of spaced apart cutouts, and the first back post connector is operably connected to the seat frame with a lower portion of the front bulbous member and a lower portion of the rear bulbous member of the first back post connector disposed in the cutouts. A second side of the seat frame has a pair of spaced apart cutouts, and the second back post connector operably connected to the seat frame with a lower portion of the front bulbous member and a lower portion of the rear bulbous member of the second back post connector disposed in the cutouts. Each of the elongated back panels includes first and second spaced apart channels therein and having a cutout extending from the channels and opening onto a rear surface of the back panels, the cutouts having a width less than a width of the channel, and wherein the channels of the elongated back panels are receivable on the front bulbous members of the spaced apart back post connectors so that the plurality of back panels form a back.

In another embodiment, a method for forming an article of furniture includes providing a seat frame, forming a plurality of cutouts in a rear portion of the seat frame, and operably attaching lower portions of a pair of back post connectors having a front bulbous member, a rear bulbous member, and a web disposed therebetween to the seat frame with the lower portion of bulbous members in the plurality of cutouts. In some embodiments, the method may include forming first and second cutouts along sides of the seat frame, and operably attaching a pair of seat connectors having a front bulbous member, a rear bulbous member, and a web disposed therebetween to the seat frame with the lower bulbous members in the first and second cutouts.

BRIEF DESCRIPTION OF THE DRAWINGS

The subject matter which is regarded as the disclosure is particularly pointed out and distinctly claimed in the concluding portion of the specification. The disclosure, however, may best be understood by reference to the following detailed description of various embodiments and the accompanying drawings in which:

DETAILED DESCRIPTION

Figure 1:
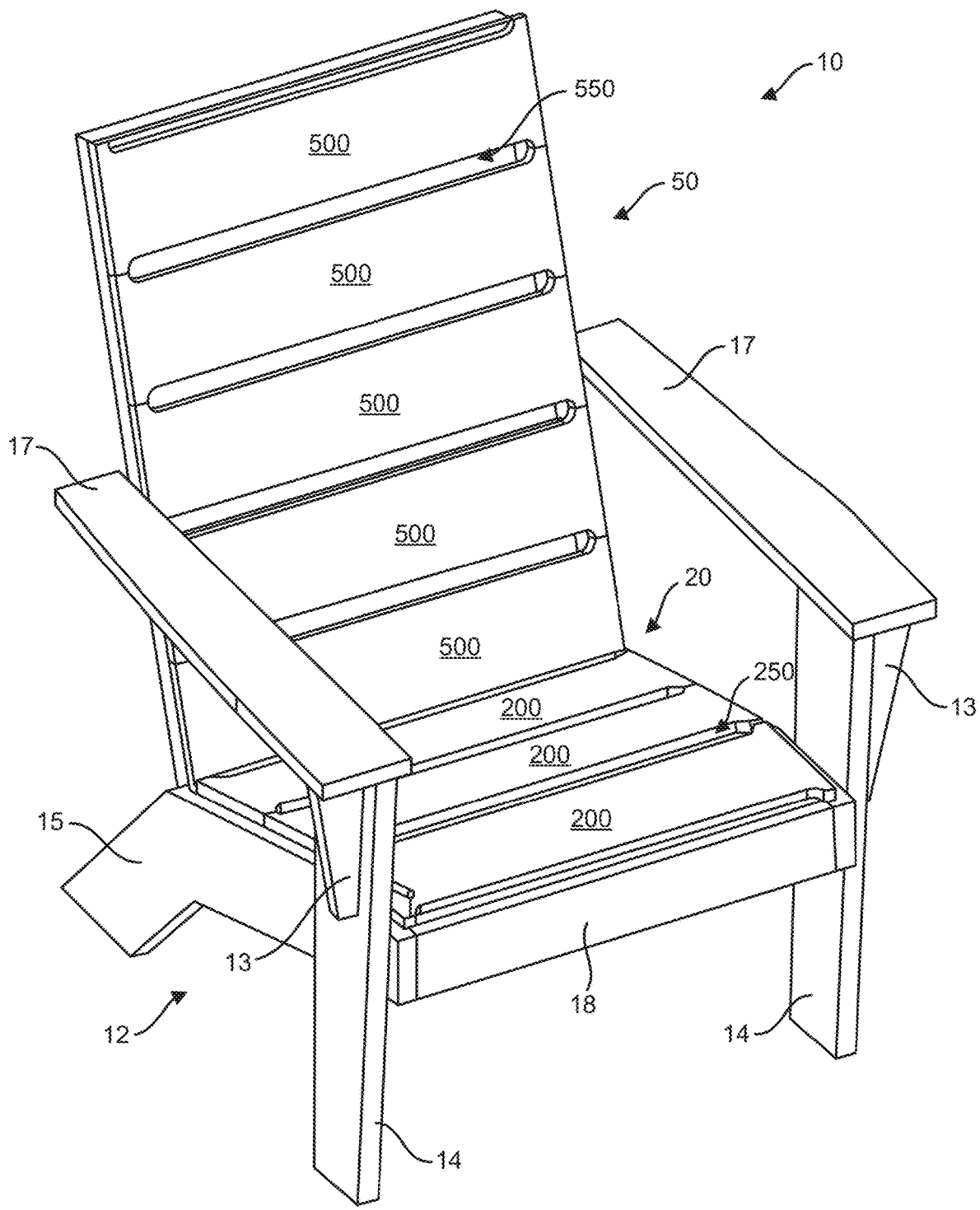
FIG. 1 is a perspective view of a seat, according to an embodiment of the present disclosure.
Figure 7:
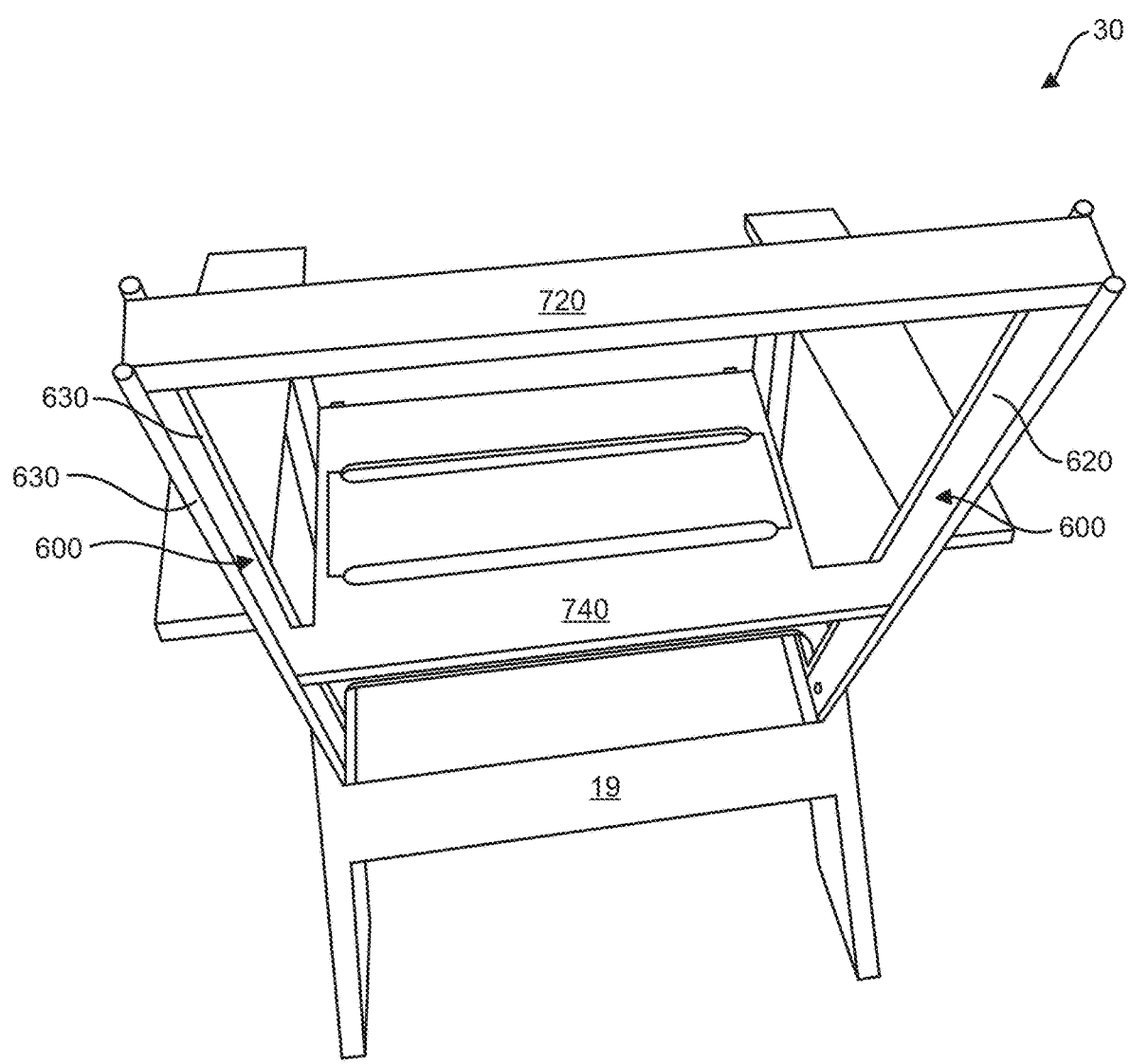
FIG. 7 is a rear perspective view of the seat of FIG. 1 without back panels, according to an embodiment of the present disclosure.

FIG. 1 illustrates an article of furniture 10 such as a chair constructed and assembled according to an embodiment of the present disclosure. In this illustrated embodiment, article of furniture 10 generally includes a seat frame 12, a seat 20 and a back 50. Seat frame 12 may include a pair of front vertical legs 14, a pair of rear legs and seat support 15, a pair of arms 17, a pair of angle brackets 13, a front apron 18, and a rear apron 19 (FIG. 7). It will be appreciated that in other embodiments of the present disclosure, the seat frame may be configured differently. Seat 20 includes a plurality of generally rigid seat panels 200. Back 50 includes a plurality of rigid back panels 500.

As described below, the panels may be slidably attachable. This allows assembling the articles of furniture for customers in any panel color combination from a large selection of colors. A customer may also change panels in the future if they want to change the look of the article of furniture. In some embodiments, all of the panels may be identical. In other embodiments, the panels may be different, for example, having different configuration, colors, and/or materials. In some embodiments, the panels may be fabricated from a Marine Grade Polymer material, and the remainder of the seat may be made from Marine Grade Polymer and aluminum.

Figure 2:
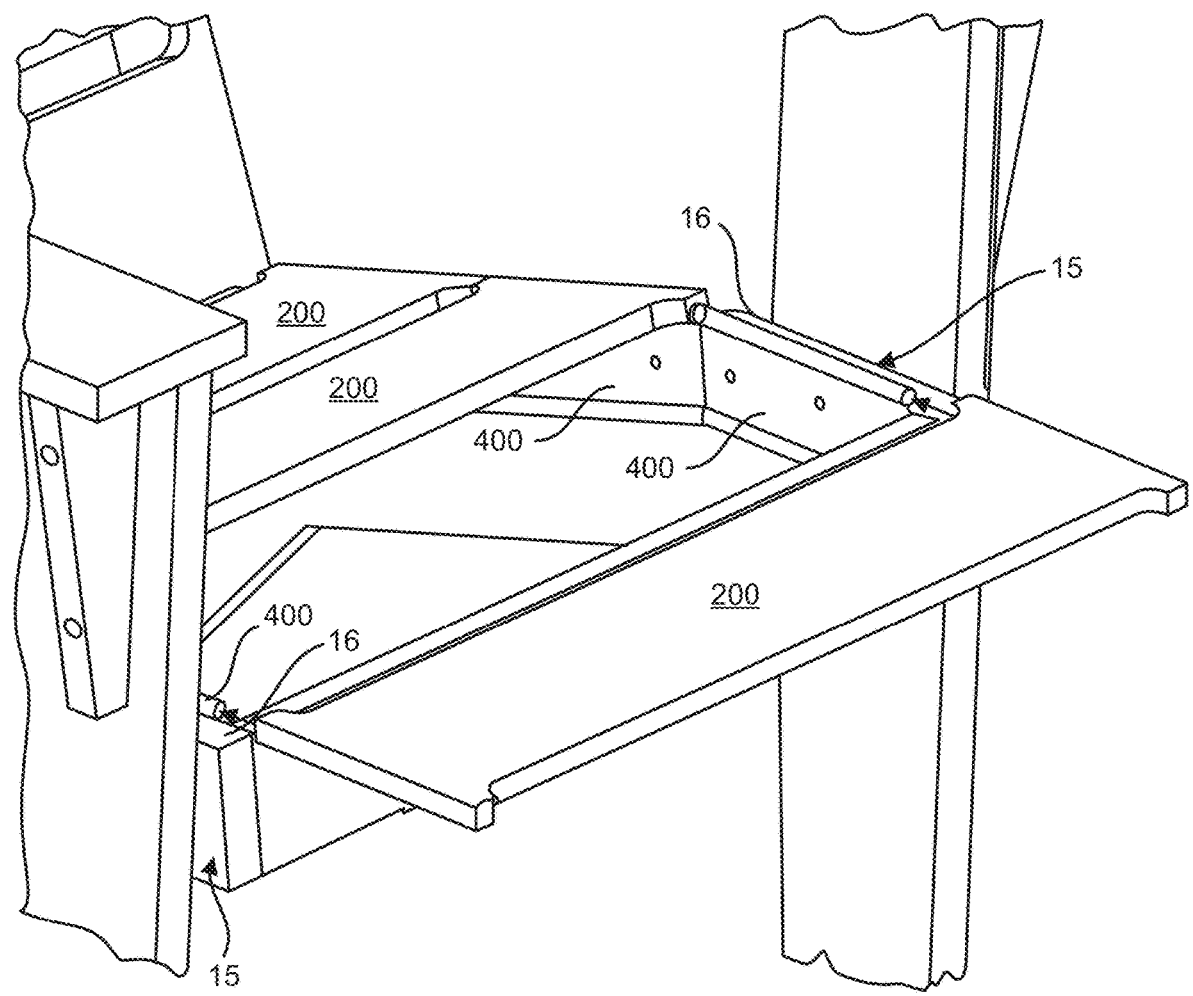
FIG. 2 is an enlarged, exploded perspective view of the front portion of the seat of FIG. 1, according to an embodiment of the present disclosure.

FIG. 2 illustrates a plurality of seat connectors 400 operable for connecting seat panels 200 to the pair of rear legs and seat supports 15. In particular, seat connectors 400 are operably attached along the inside of the pair of rear legs and seat supports 15, with a portion of the connectors disposed above a top surface 16 of the pair of rear legs and seat supports 15.

Figure 3:
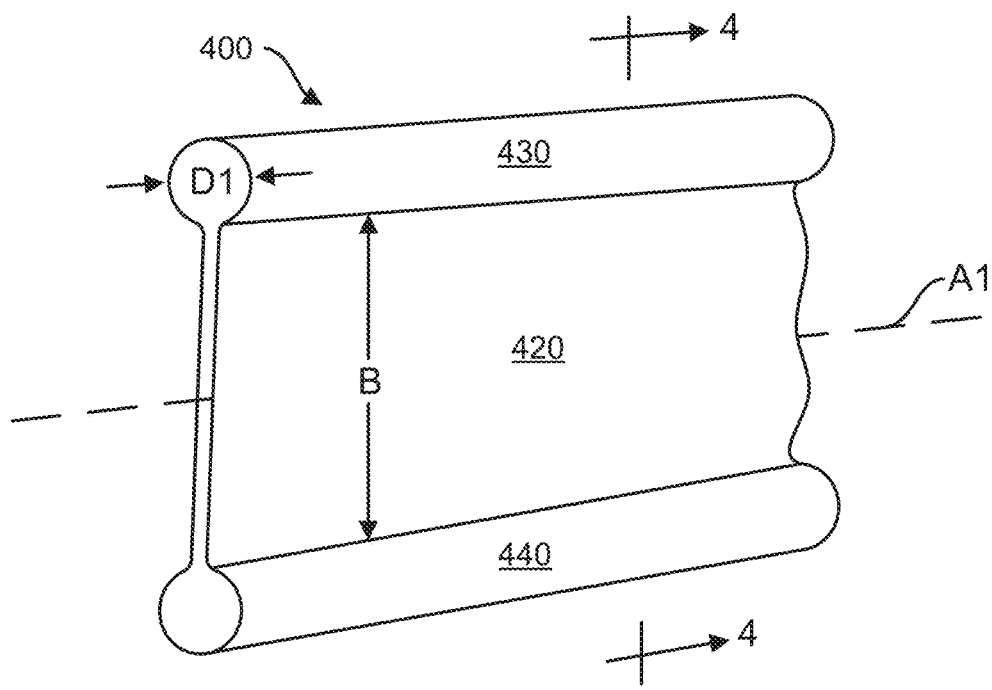
FIG. 3 is an enlarged perspective view of a seat connector of FIG. 2, according to an embodiment of the present disclosure.
Figure 4:
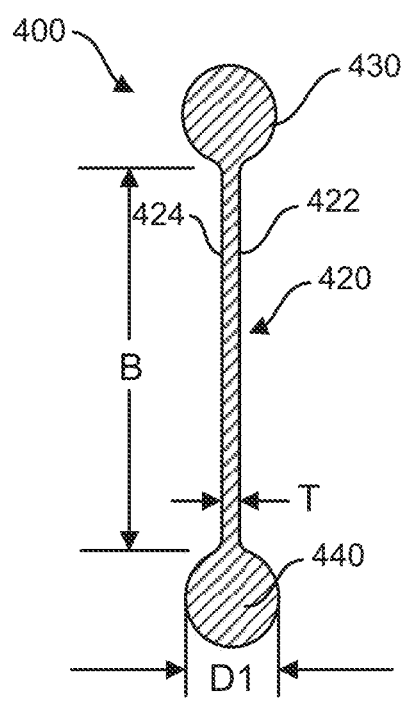
FIG. 4 is a cross-sectional view of the seat connector taken along line 4-4 in FIG. 3, according to an embodiment of the present disclosure.

As shown in FIGS. 3 and 4, seat connectors 400 may include a longitudinally extending planar web member 420, an upper longitudinally extending bulbous member 430, and a lower longitudinally extending bulbous member 440. Web member 420 may have a first surface 422 and a second surface 424, and the bulbous member may extend outwardly from first surface 422 and second surface 424. For example, the bulbous members may be cylindrical members. Desirably, the web member resists shear forces, while the bulbous members resist most of the bending moment experienced by seat connector 400. The web may have a height B of about 1.75 inches, and the cylindrical members may have a diameter D1 of about ⅜ inch. The web may have a thickness T of about 1/16 inch or 0.05 inch. The seat connector may have a barbell shape. The upper bulbous member may be similarly sized and configured as the bottom bulbous member. In some embodiments, the bulbous members have the same cross-section. For example, the seat connector may be symmetric about a longitudinal axis A1. The seat connectors may be a one-piece, monolithic, or integral seat connector.

Figure 5:
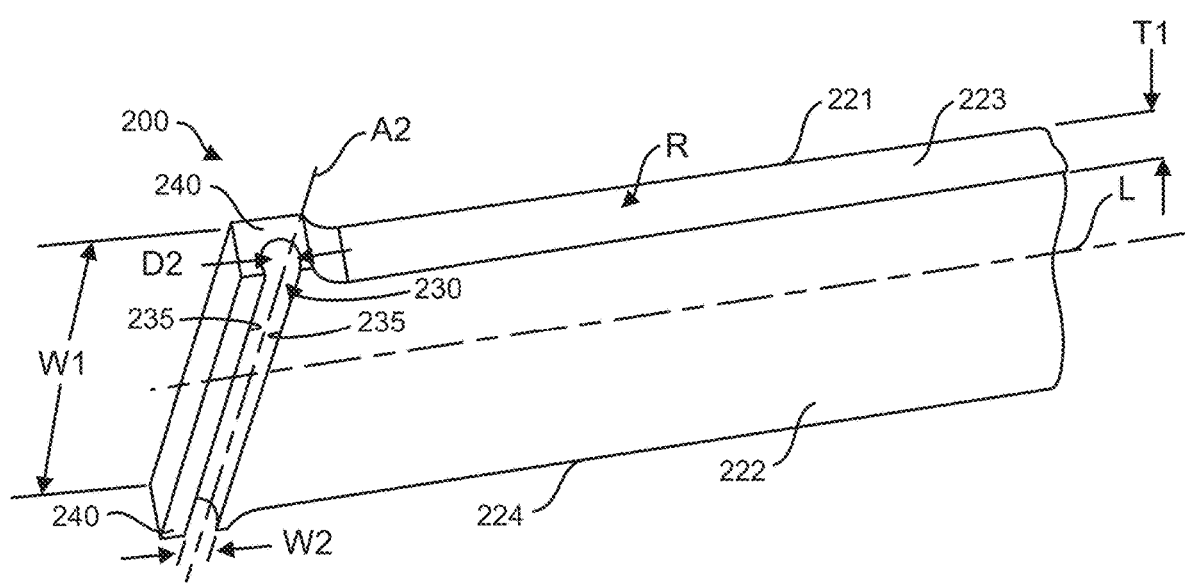
FIG. 5 is an enlarged perspective view of the seat panel of the seat of FIG. 1, according to an embodiment of the present disclosure.

FIG. 5 illustrates a bottom perspective view of a portion of one of the seat panels 200 having a generally elongated planar configuration. Panel 200 includes a top surface 221, a bottom surface 222, longitudinally-extending peripherally extending sides 223 and 224 disposed therebetween, and a longitudinal axis L. Disposed along the end portions (only one of which is shown in FIG. 5) of seat panel 200 are channels 230 having a bottom cutout or opening 235, which channel 230 and bottom opening 235 extend along an axis A2 across the width of support panel 200. Axis A2 is disposed perpendicular to longitudinal axis L. The seat panels 200 include end portions with channels 230 (one shown in FIG. 5) being wider than the middle portion of the seat panel 200 so that seat panels 200 define openings 250 (FIG. 2) between adjacent panels 200 along the seat 20 of article of furniture 10. Panels 200 may have a constant thickness T1 along its longitudinal length with channels 230 disposed within the constant thickness of panel 230 and across the entire width W1 of panel 200 from longitudinally peripherally extending side 223 to longitudinally peripherally extending side 224.

Similarly, as shown in FIG. 1, the back panels 500 include end portions with the channels being wider than the middle portion of the back panel 500 so that back panels 500 define cutouts or openings 550 between adjacent panels 500 along back 50 of article of furniture 10. In addition, in this illustrate embodiment, the elongated back panels and elongated seat panels are disposed so that the longitudinal axes of the panels extend from the left side to the right side of the article of furniture. In some embodiments, the seat panels and the back panels have the same length and width. In some embodiments, the seat and the back of the article of furniture have the same width.

With reference again to FIG. 5, in this embodiment, channel 230 may have a generally circular cross-section. Bottom opening 235 may have a width W2 sized smaller than the diameter D2 of the circular cross-section and extend from longitudinally peripherally extending side 223 to longitudinally peripherally extending side 224. A relief R may extend along the length of panel 200 resulting in outwardly extending portions 240 along the edge portions of panel 200. With reference again to FIG. 2, the cutout in seat panels 200 may be sized for a tight fit or press fit connection with the bulbous portion of seat connector 400. The diameter D2 of the cutout may be about ⅜ inch. It will be appreciated that the cutout and bulbous member may have other configurations. For example, the cutout and bulbous member may have square, rectangular, or other suitable mattingly engaging configurations.

Figure 6:
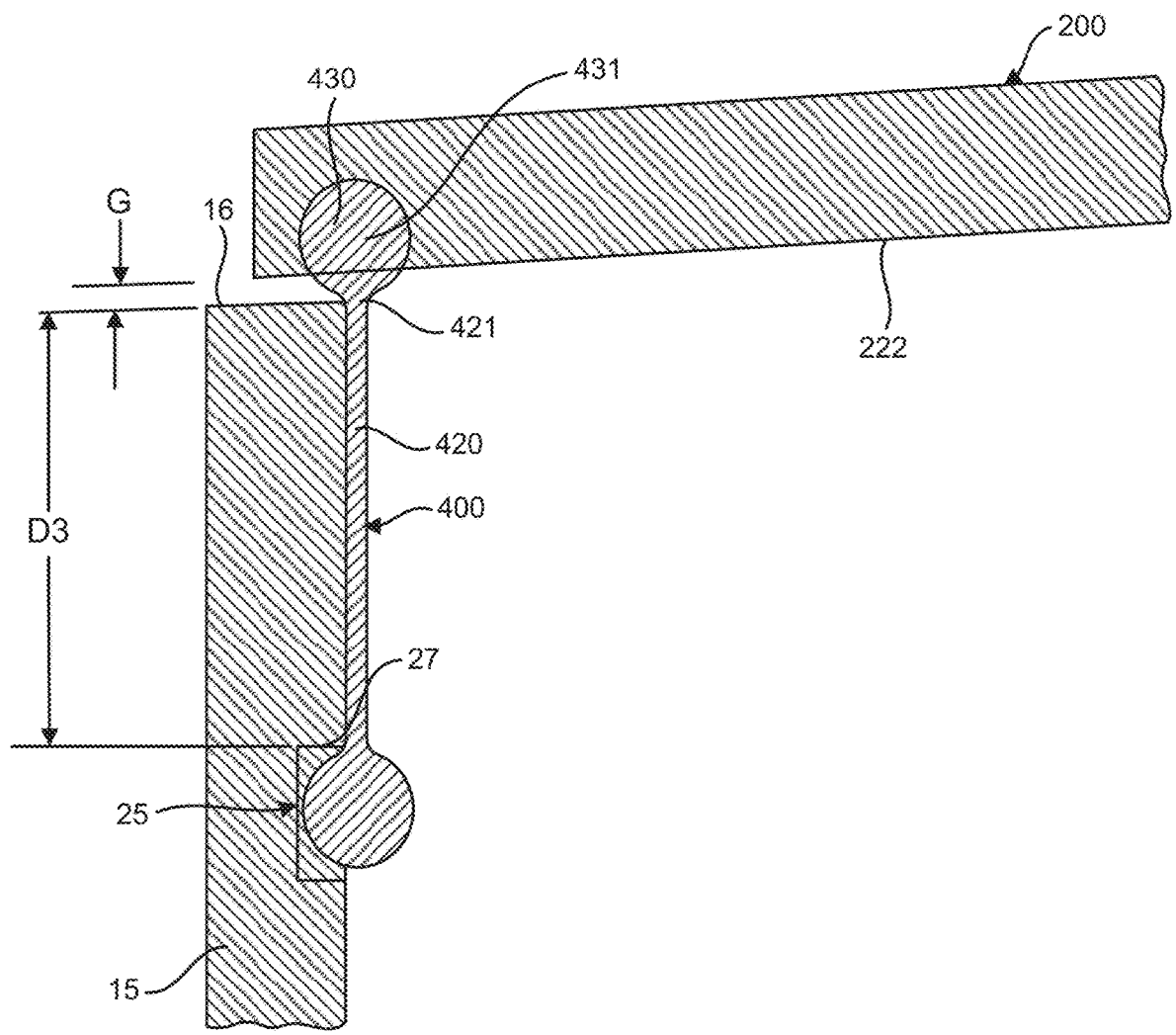
FIG. 6 is an enlarged cross-sectional view of the attachment of the seat panel to a seat connector in FIG. 1, according to an embodiment of the present disclosure

FIG. 6 illustrates a cross-sectional view of the attachment of the seat panel 200 to the seat connector 400. As shown, the bottom surface 222 of the seat panel 200 may be spaced apart from top edge 16 of rear legs and seat supports 15 a distance G of about 5/32 inch. For example, the bottom surface 222 of the seat panel 200 may be spaced apart from a top 421 of web 420, the bottom surface 222 of the seat panel 200 may be spaced apart from top edge 16 of rear legs and seat supports 15 a distance G of about 5/32 inch, and a bottom 431 of bulbous member 430 may be spaced apart from top edge 16 of rear legs and seat supports 15 a distance G of about 5/32 inch. As shown in FIG. 6, the seat panel 200 may be a solid seat panel. The solid seat panels may be fabricated from a Marine Grade Polymer material or other suitable material.

As shown in FIG. 7, back 30 of the article of furniture may include a pair of back post connectors 600 that act as back posts, a top rail 720, and a cross-member 740. Back posts connectors 600 may be essentially the same as seat connectors 400 described above. Desirably, the web member 620 of the back post connector 600 resists shear forces, while the bulbous members 630 resist most of the bending moment experienced by back post connector 600.

Figure 8:
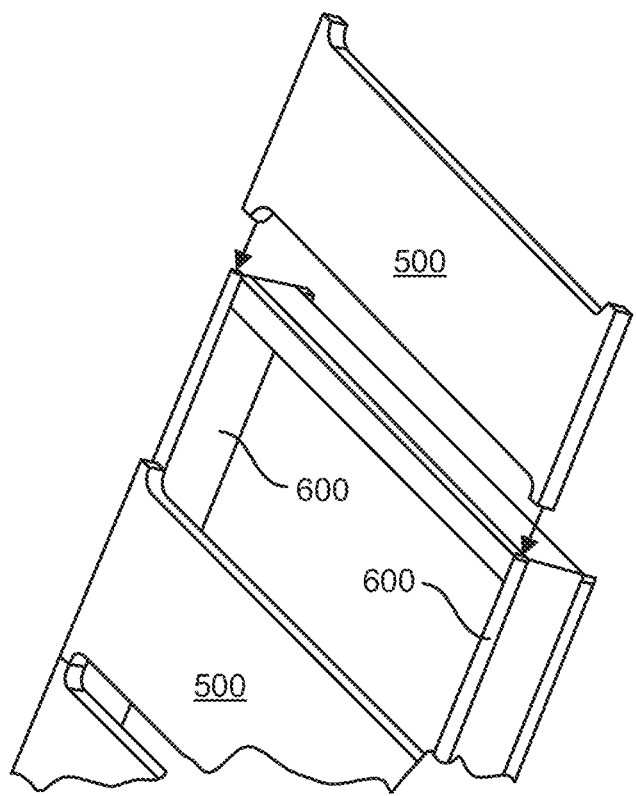
FIG. 8 is an exploded, front perspective view of the back of the seat of FIG. 1, according to an embodiment of the present disclosure.
Figure 9:
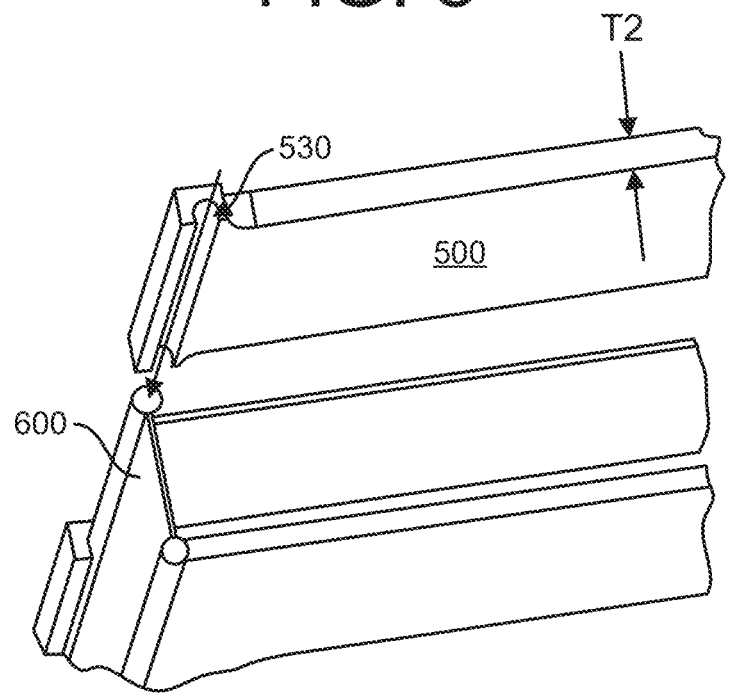
FIG. 9 is an exploded, rear perspective view of the back of the seat of FIG. 1, according to an embodiment of the present disclosure.

With reference to FIGS. 8 and 9, back panels 500 may be essentially the same as seat panel 200 described above. Back panel 500 are slid onto back post connectors 600. Panels 500 may have a constant thickness T2 along its longitudinal length with channels 530 disposed within the constant thickness of panel 500.

Figure 10:
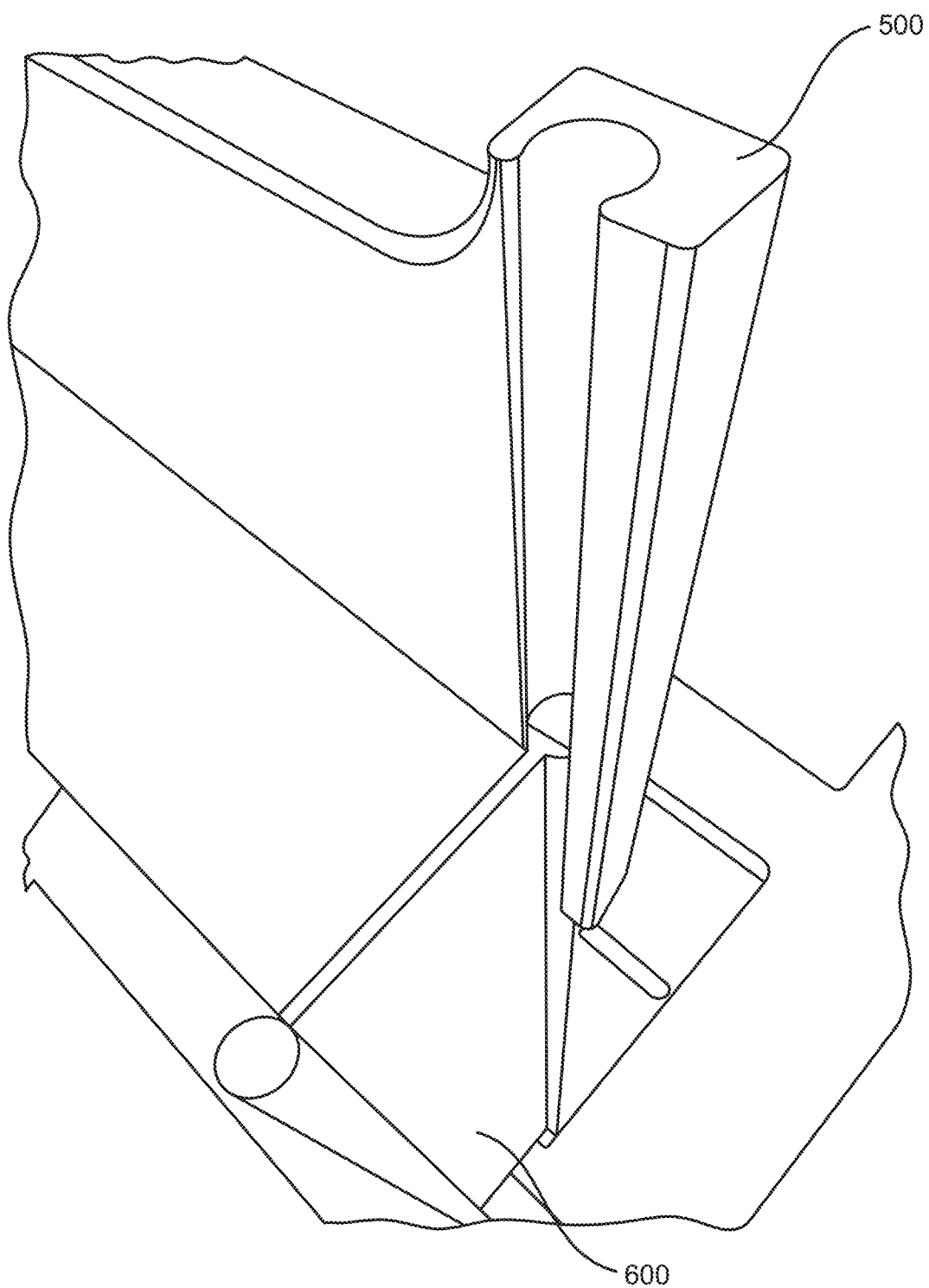
FIG. 10 is an enlarged, rear perspective view of the back of the seat of FIG. 1 with a back support partially removed/installed, according to an embodiment of the present disclosure.

FIG. 10 illustrates back panel 500 being slid onto back post connectors 600. The cutout in back panels 500 may be sized to for a tight fit or press fit connection with the bulbous portion of back post connector 600.

Figure 11:
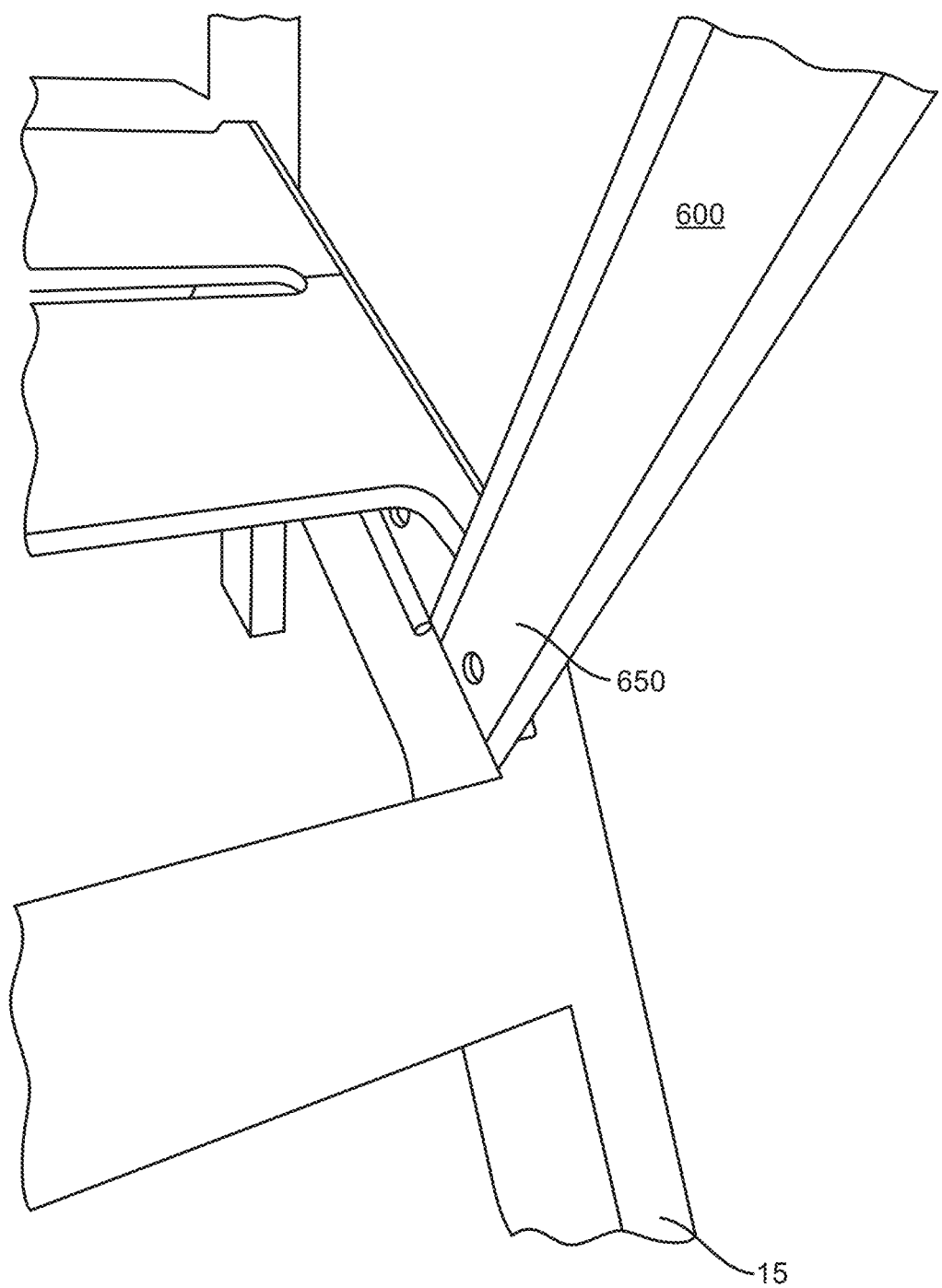
FIG. 11 is an enlarged, rear perspective view of the back of the seat of FIG. 1 with the back supports removed, according to an embodiment of the present disclosure.

FIG. 11 illustrates the attachment of the lower portion 650 of back post 600 to rear legs and seat supports 15.

Figure 12:
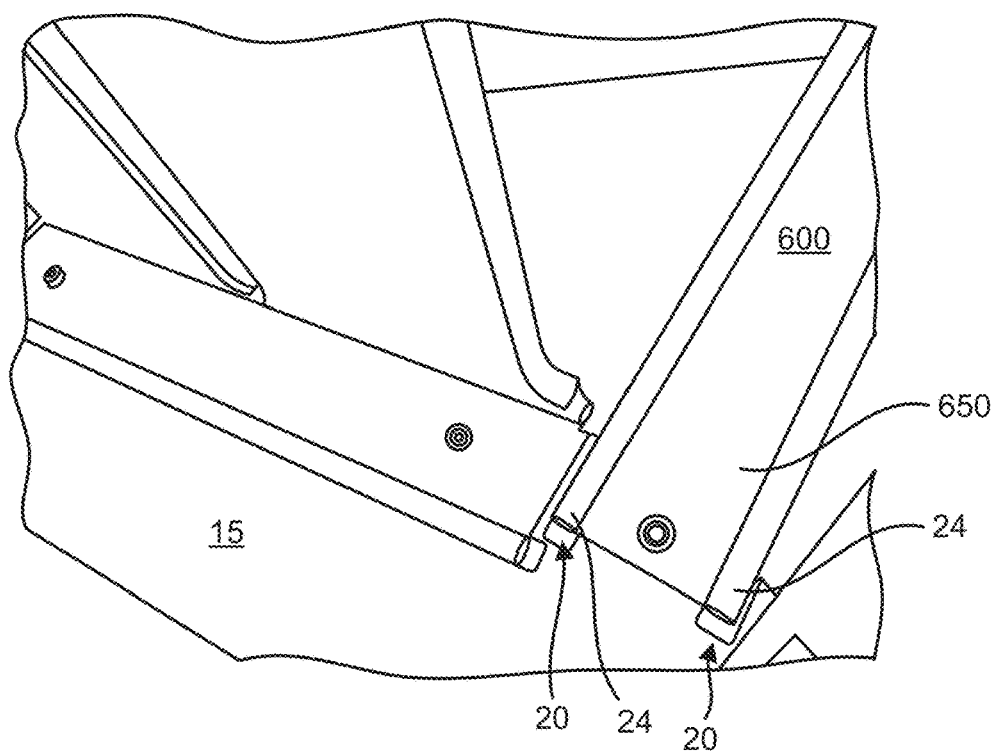
FIG. 12 is an enlarged, perspective view of the bottom of the seat of FIG. 1 with the back supports removed, according to an embodiment of the present disclosure.

As best shown in FIG. 12, rear legs and seat supports 15 includes a pair of parallel cutouts 20 having an axis of the cutouts disposed at the angle to correspond to the angle of the back of the seat. In particular, inner sides 24 of cutouts 20 are sized to correspond to the width B (FIG. 3) so that the web 620 rests flat against the inside surface of rear legs and seat supports 15. When the lower portion 650 of back post connector 600 is attached to rear legs and seat supports 15, the inner portions of the cutout may engage the bulbous member of back post support 600 and inhibit rotation. As shown in FIG. 1, arms 17 may be operably attached to back post support and front legs 14 to aid in maintaining back 50 in an upright orientation.

Figure 13:
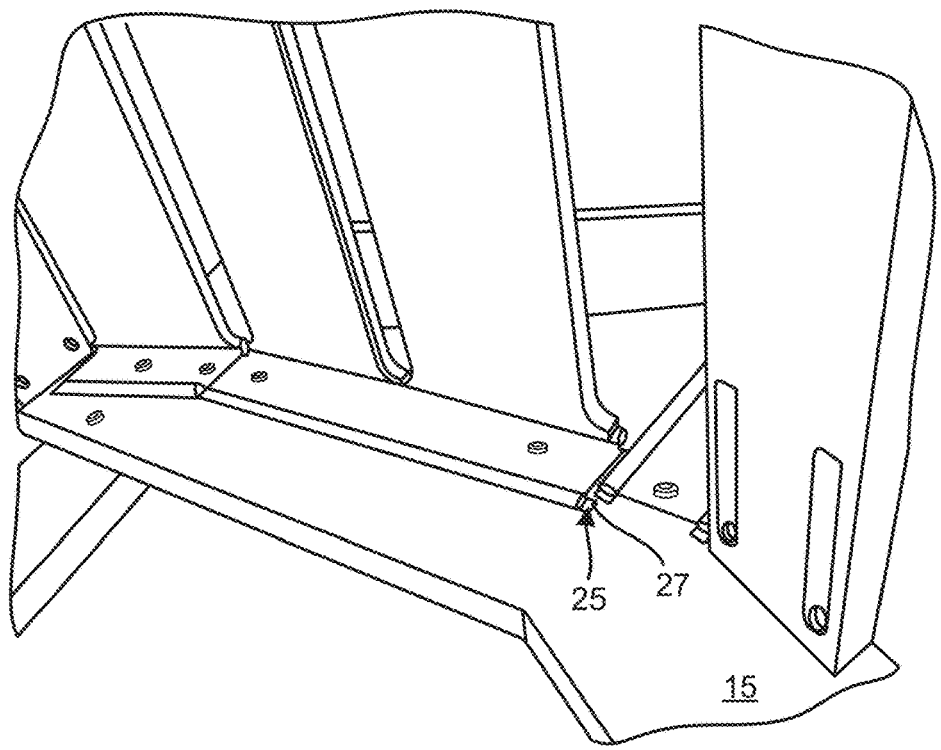
FIG. 13 is an enlarged, perspective view of the bottom of the seat of FIG. 1 with the back supports removed, according to an embodiment of the present disclosure.
Figure 14:
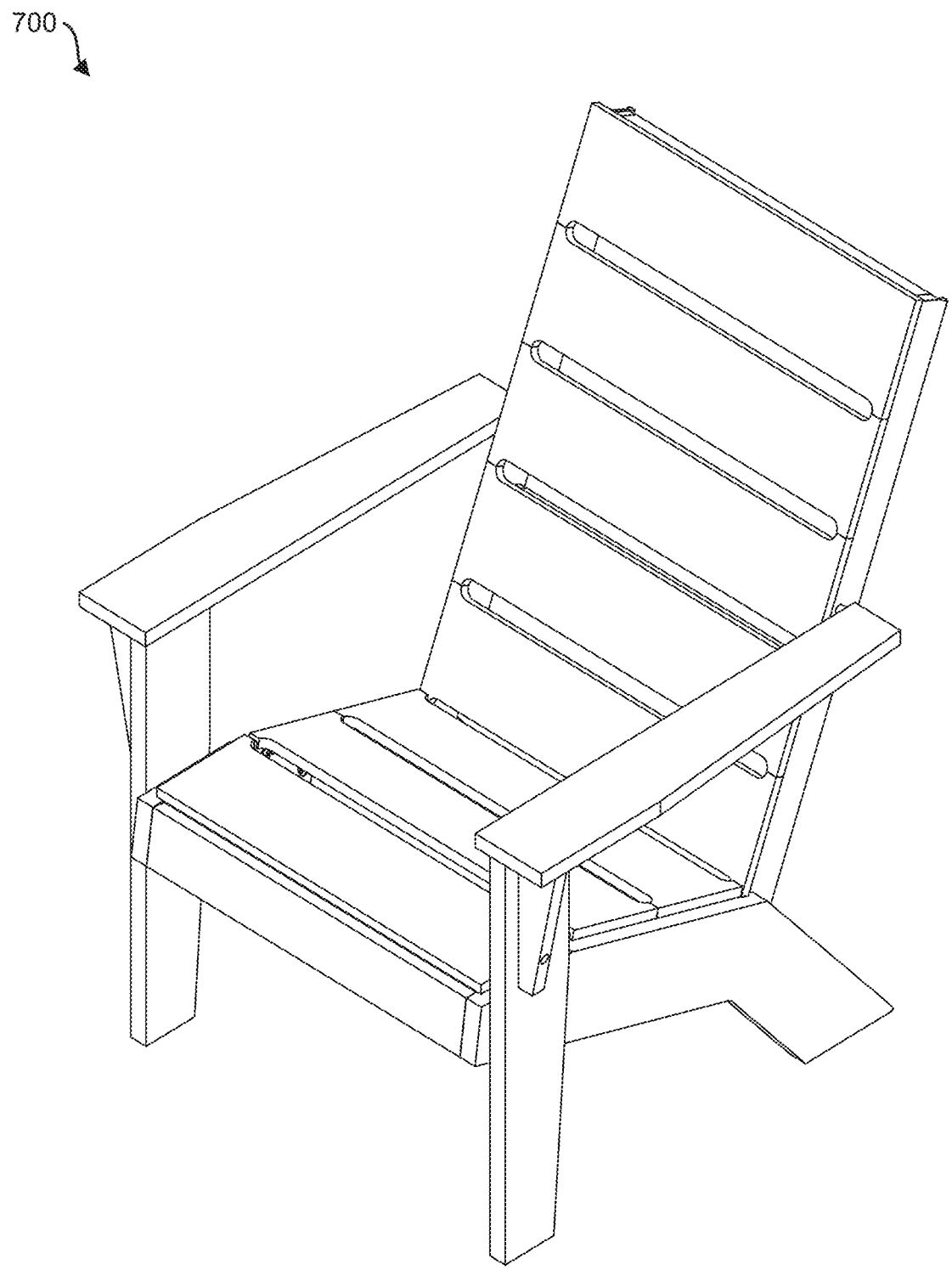
FIGS. 14-20 are perspective, front, back, left, right, top, and bottom views of an article of furniture, according to an embodiment of the present disclosure.
Figure 15:
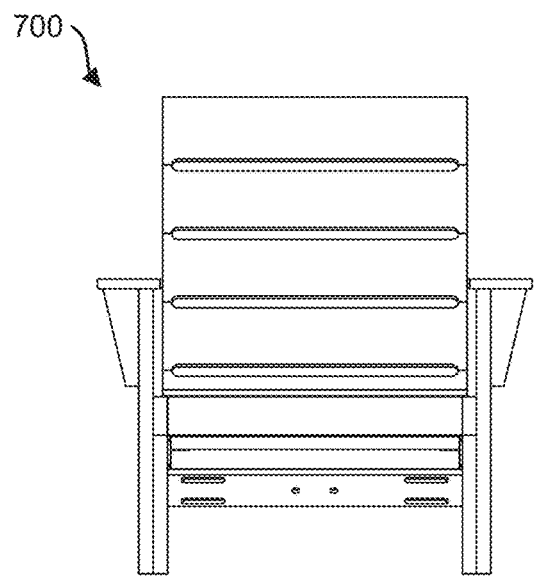
Figure 16:
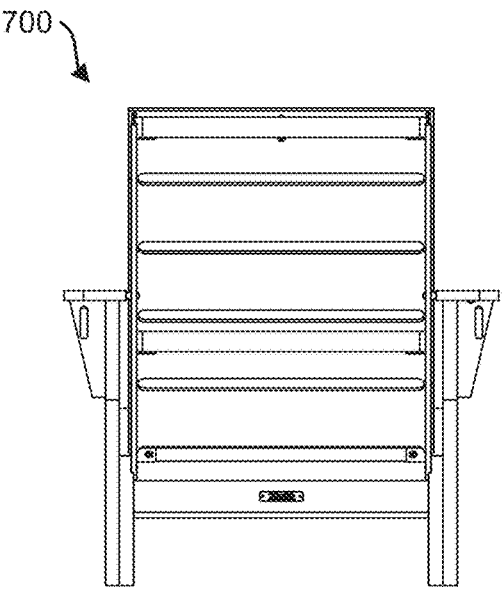
Figure 17:
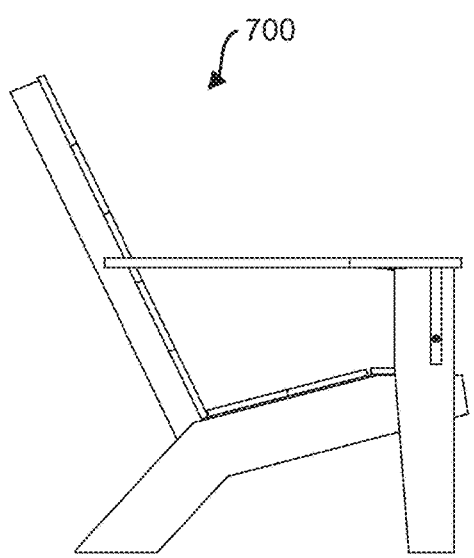
Figure 18:
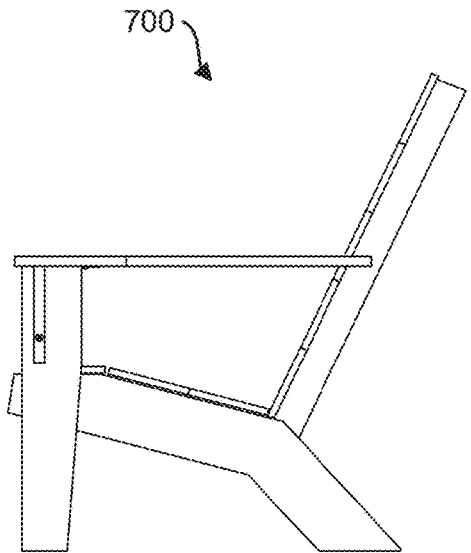
Figure 19:
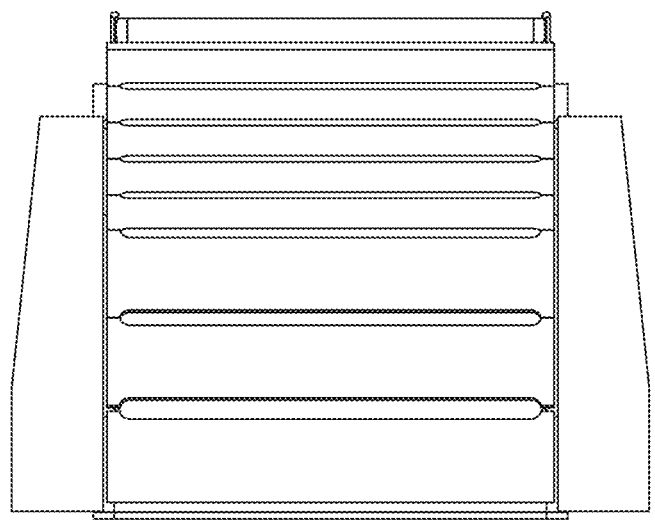
Figure 20:
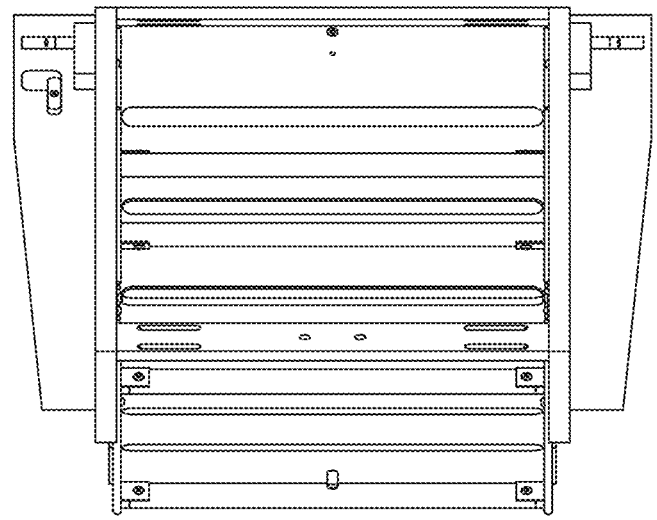

As best shown in FIG. 13, rear legs and seat supports 15 includes cutouts 25 having an axis of the cutouts disposed at the angle parallel to the top edge. In particular, the distance D3 (FIG. 6) between inner side 27 of cutouts 25 a top edge 16 (FIGS. 2 and 6) is sized to correspond to the width B (FIG. 3) so that web 420 rests flat against the inside surface of rear legs and seat supports 15.

With reference again to FIG. 1, the inner edge of the arms may include a cutout for receiving the bulbous members of the back post connectors.

FIGS. 14-20 illustrate an article of furniture 700 according to an embodiment of the present disclosure, which incorporates the features described above.

Figure 21:
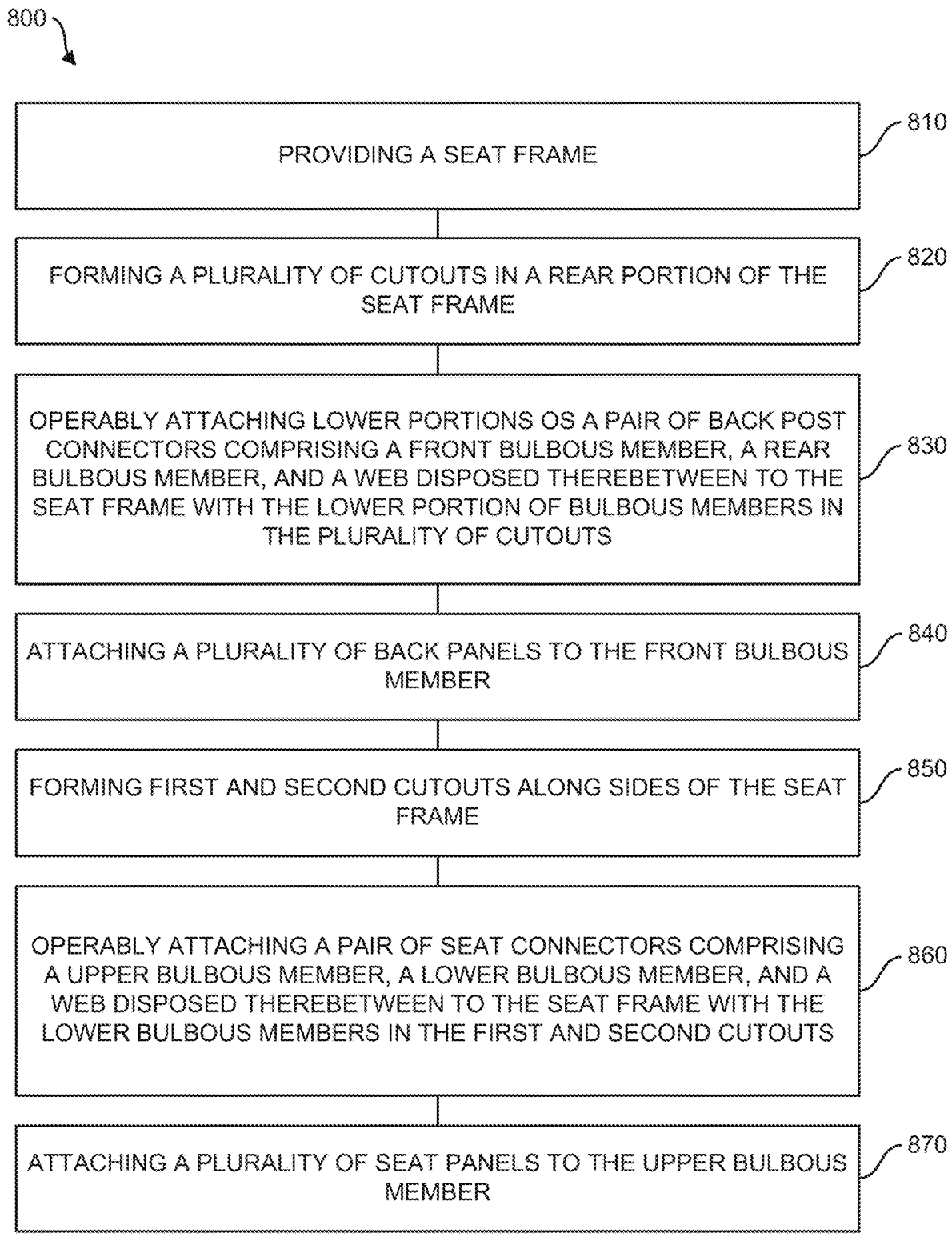
FIG. 21 is a flowchart of a method for forming an article of furniture, according to an embodiment of the present disclosure.

FIG. 21 illustrates a method 800 for forming an article of furniture, according to an embodiment of the present disclosure. Method 800 includes at 810 providing a seat frame, at 820 forming a plurality of cutouts in a rear portion of the seat frame, and at 830 operably attaching lower portions of a pair of back post connectors having a front bulbous member, a rear bulbous member, and a web disposed therebetween to the seat frame with the lower portion of bulbous members in the plurality of cutouts.

The method 800 may further include at 840 attaching a plurality of back panels to the front bulbous member. In other embodiments, the method 800 may include at 850 forming first and second cutouts along sides of the seat frame, at 860 operably attaching a pair of seat connectors having an upper bulbous member, a lower bulbous member, and a web disposed therebetween to the seat frame with the lower bulbous members in the first and second cutouts, and at 870 attaching a plurality of seat panels to the upper bulbous member.

Figure 22:
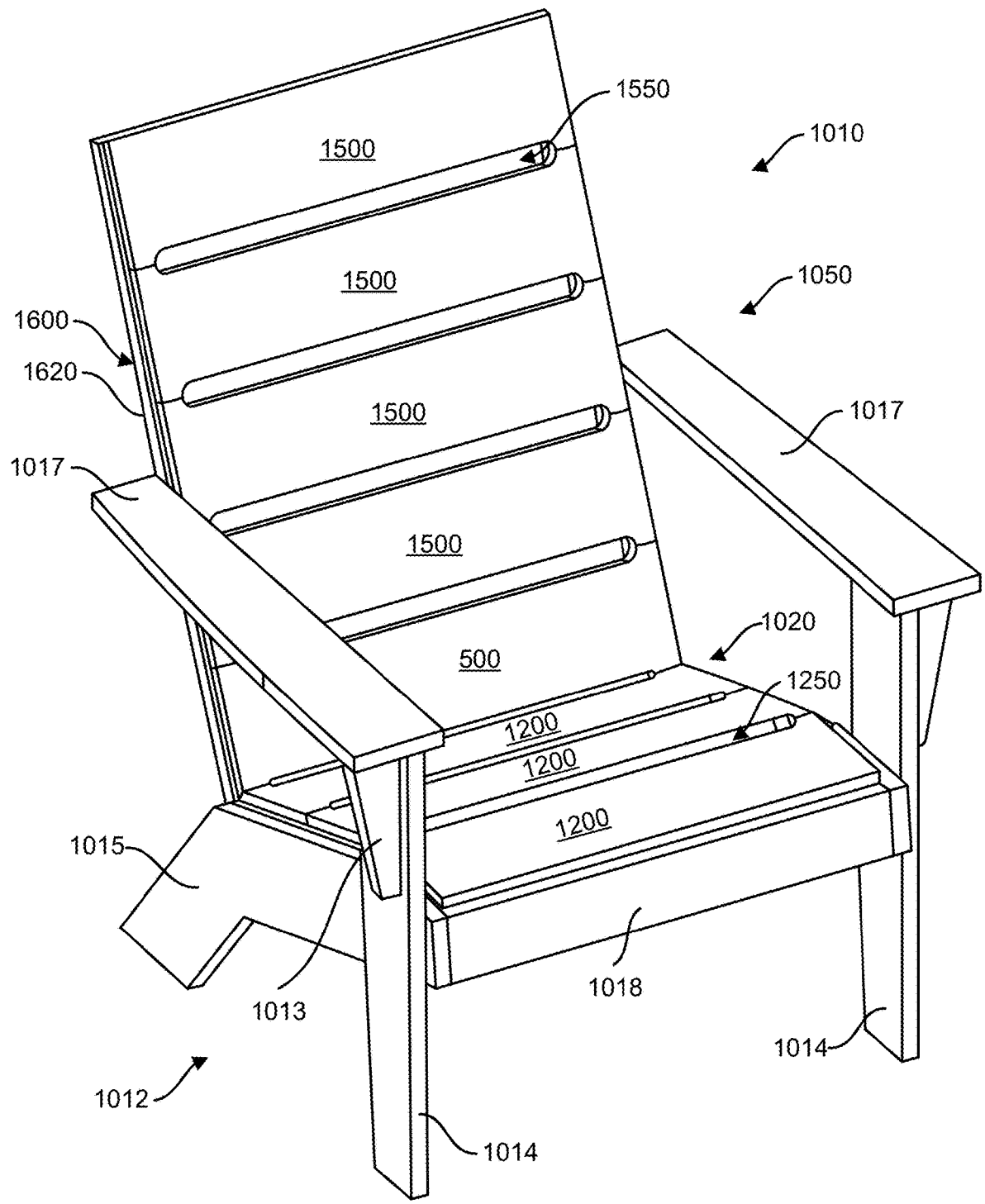
FIG. 22 is a perspective view of a seat, according to an embodiment of the present disclosure.
Figure 28:
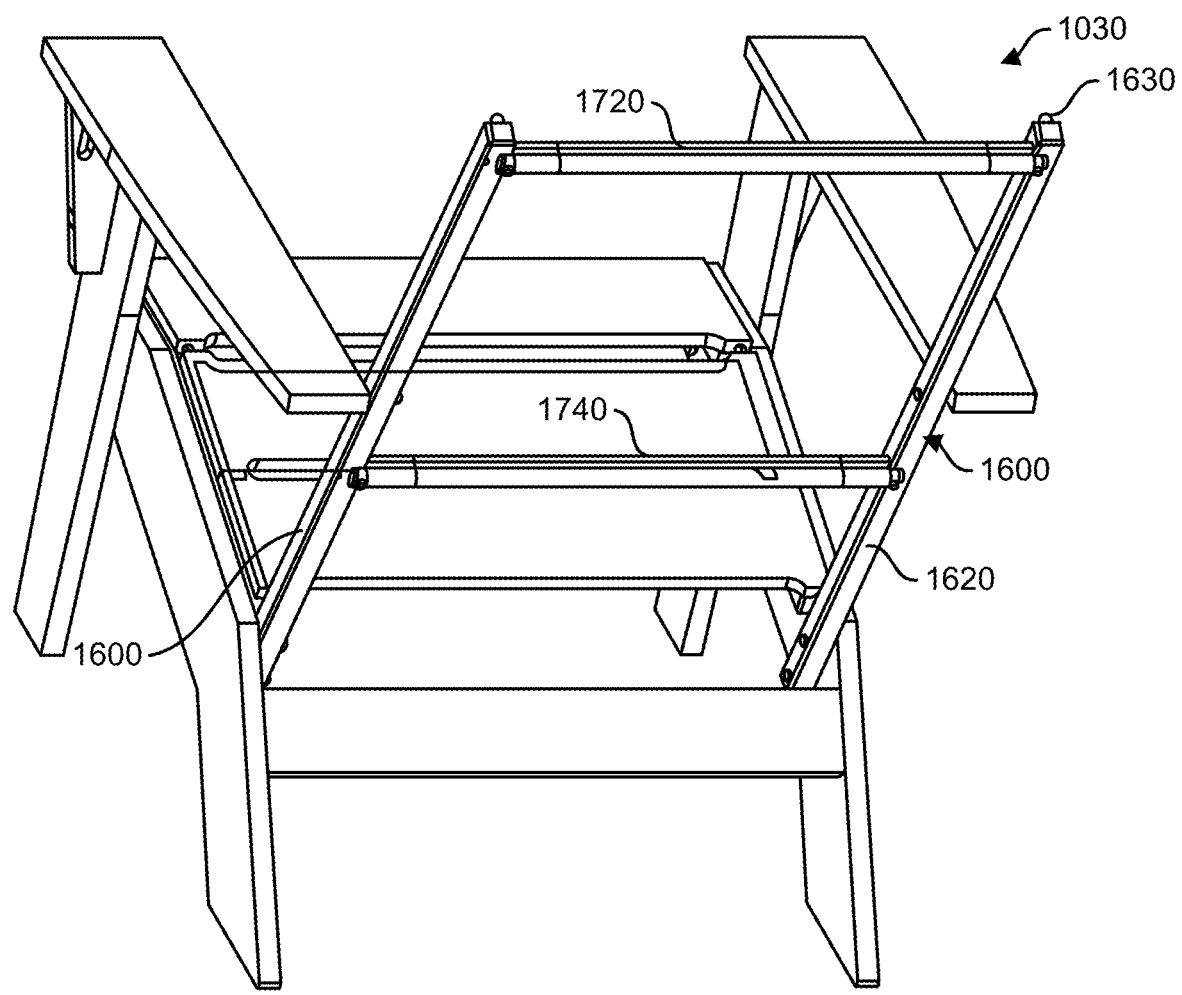
FIG. 28 is a rear perspective view of the seat of FIG. 22 without back panels, according to an embodiment of the present disclosure.

FIG. 22 illustrates an article of furniture 1010 such as a chair constructed and assembled according to an embodiment of the present disclosure. In this illustrated embodiment, article of furniture 1010 generally includes a seat frame 1012, a seat 1020 and a back 1050. Seat frame 1012 may include a pair of front vertical legs 1014, a pair of rear legs and seat support 1015, a pair of arms 1017, a pair of angle brackets 1013, a front apron 1018, and a rear apron 1019 (FIG. 28). In some embodiments, a left side and a right side of the seat frame may include vertically-disposed inner surfaces.

It will be appreciated that in other embodiments of the present disclosure, the seat frame may be configured differently. Seat 1020 includes a plurality of generally rigid seat panels 1200. Back 1050 includes a plurality of rigid back panels 1500.

As described below, the panels may be slidably attachable. This allows assembling the articles of furniture for customers in any panel color combination from a large selection of colors. A customer may also change panels in the future if they want to change the look of the article of furniture. In some embodiments, all of the panels may be identical. In other embodiments, the panels may be different, for example, having different configuration, colors, and/or materials. In some embodiments, the panels may be fabricated from a Marine Grade Polymer material, and the remainder of the seat may be made from Marine Grade Polymer and aluminum. For example, the seat connectors and the back post connectors may be extruded aluminum members.

Figure 23:
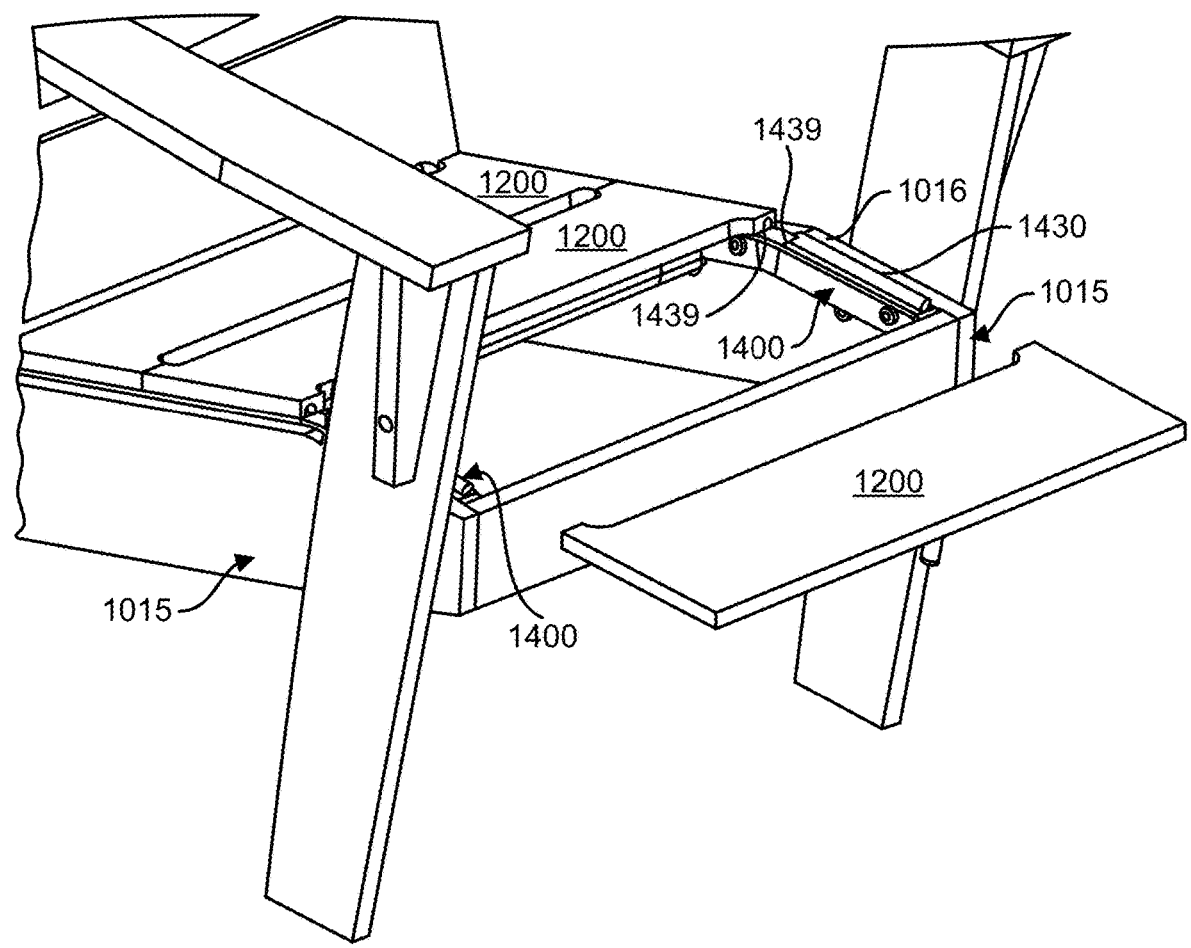
FIG. 23 is an enlarged, exploded perspective view of the front portion of the seat of FIG. 22, according to an embodiment of the present disclosure.

FIG. 23 illustrates a plurality of seat connectors 1400 operable for connecting, e.g., slidably interconnecting, seat panels 1200 to the pair of rear legs and seat supports 1015. In particular, seat connectors 1400 are operably attached along the inside of the pair of rear legs and seat supports 1015, with a portion of the connectors disposed above a top surface 1016 of the pair of rear legs and seat supports 1015.

Figure 24:
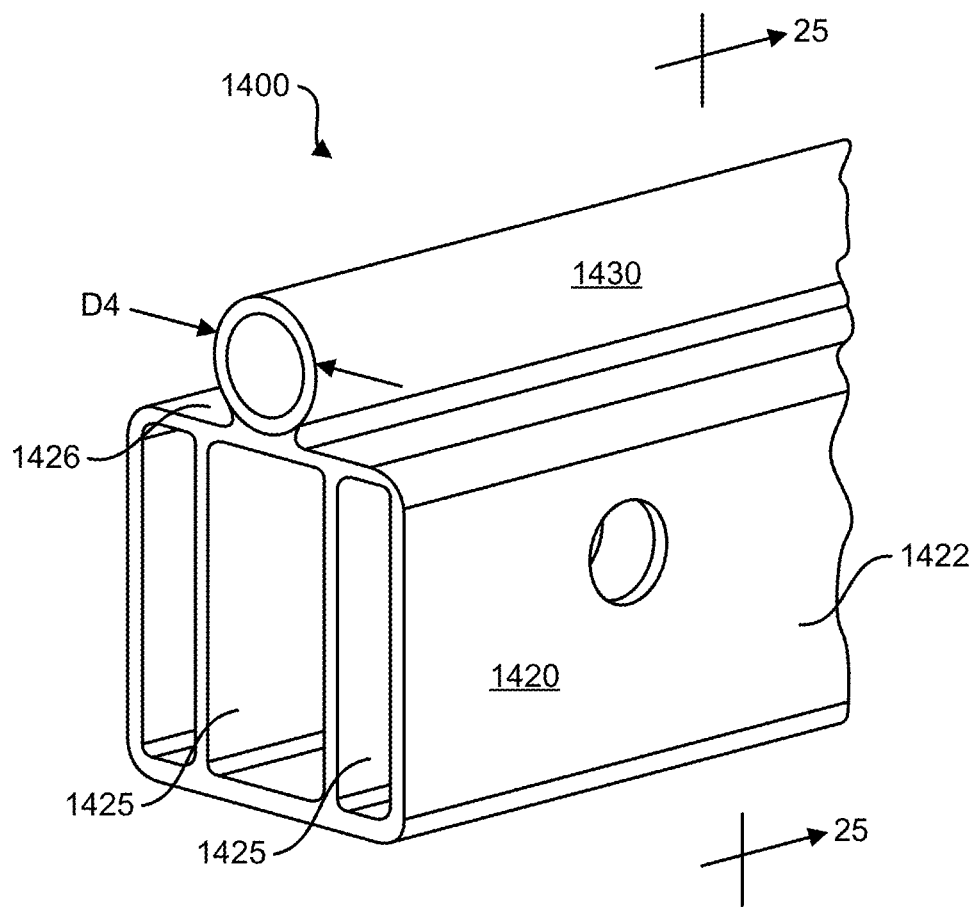
FIG. 24 is an enlarged perspective view of a seat connector of FIG. 23, according to an embodiment of the present disclosure.
Figure 25:
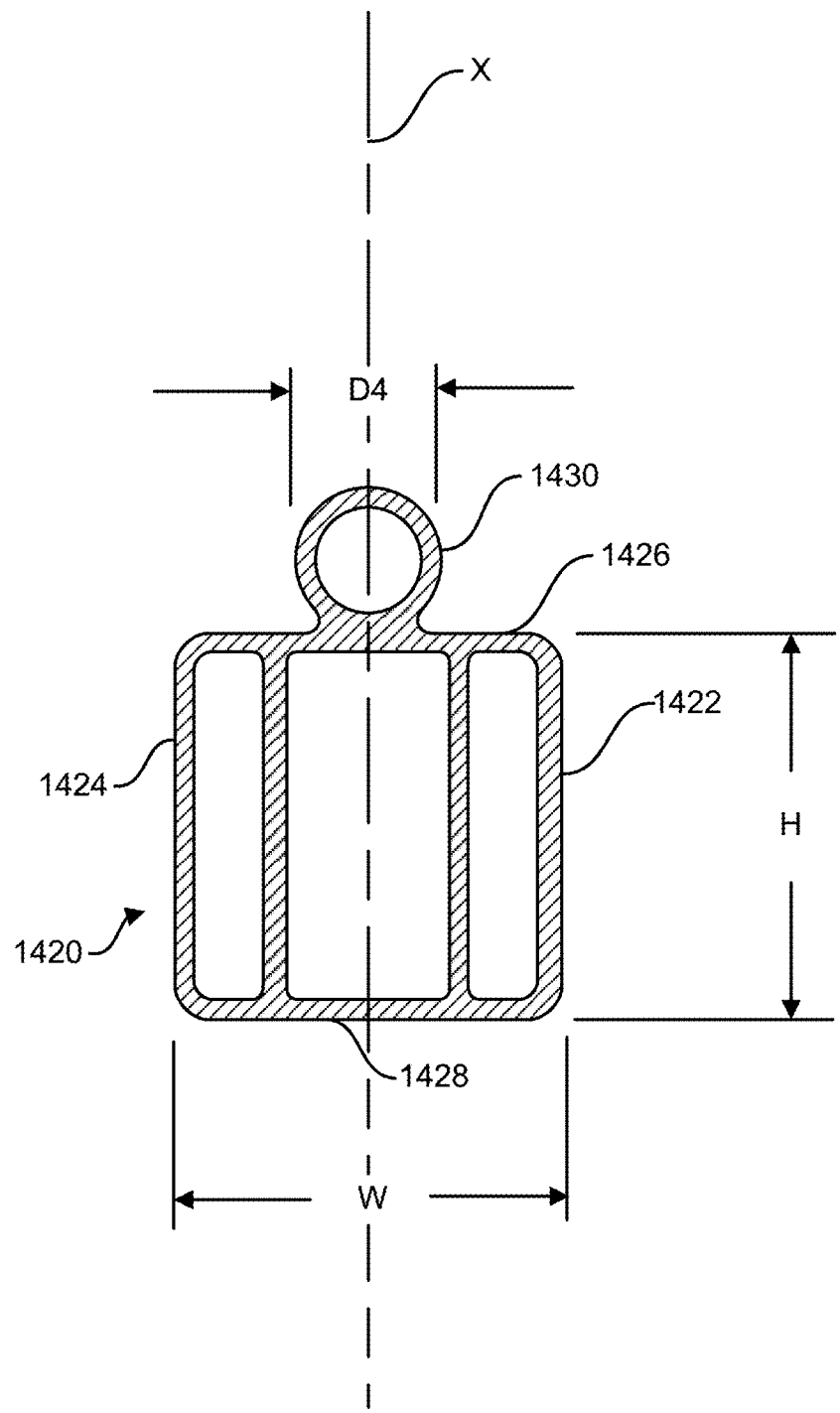
FIG. 25 is a cross-sectional view of the seat connector taken along line 25-25 in FIG. 24, according to an embodiment of the present disclosure.

As shown in FIGS. 24 and 25, seat connectors 1400 may include a longitudinally extending body 1420 and an upper longitudinally extending bulbous member 1430, e.g., a single bulbous member. Body 1420 may have a first surface 1422, a second surface 1424, a top surface 1426, a bottom surface 1428, and the bulbous member may extend outwardly from top surface 1426 between first surface 1422 and second surface 1424. For example, the bulbous members may be a hollow cylindrical member. The body may be essentially a hollow square tube member having an axis X of symmetry. In some embodiments, the body may include one or more vertical cross-members or ribs 1425. In some embodiments, the first surface 1422 and the second surface 1424 may be parallel to each other, and parallel to axis X. Top surface 1426 may be disposed normal or perpendicular to axis X, and/or normal or perpendicular to the side surface disposed against the inner surfaces of the pair of rear legs and seat supports 1015. As one of the side surfaces are disposed against the inner surfaces of the pair of rear legs and seat supports 1015, it will be appreciated that this side surface may be a planar surface, and that the other side surface need not be parallel. For example, the body of the seat connectors may have a side surface disposed on an angle or have another suitable configuration. In some embodiments, an outer cross-sectional perimeter of the body of the first and second spaced apart seat connectors is greater than an outer cross-sectional perimeter of the bulbous member of the first and second spaced apart seat connectors. In some embodiments, the body of the first and second spaced apart seat connectors is sized or has a cross-sectional area greater than the size or cross-sectional area of the bulbous member of the first and second spaced apart seat connectors. Desirably, the body resists shear forces and bending forces, while the bulbous member also resists sheer forces and bending forces or moment experienced by seat connector 1400. The body may have a height H of about 1 inch and a width W of 1 inch, and the bulbous member may have a diameter D4 of about ⅜ inch. The bulbous member 1430 and body 1420 may be hollow and have a wall thickness T4 of about 1/16 inch or 0.05 inch. The seat connectors may be a one-piece, monolithic, or integral seat connector.

Figure 26:
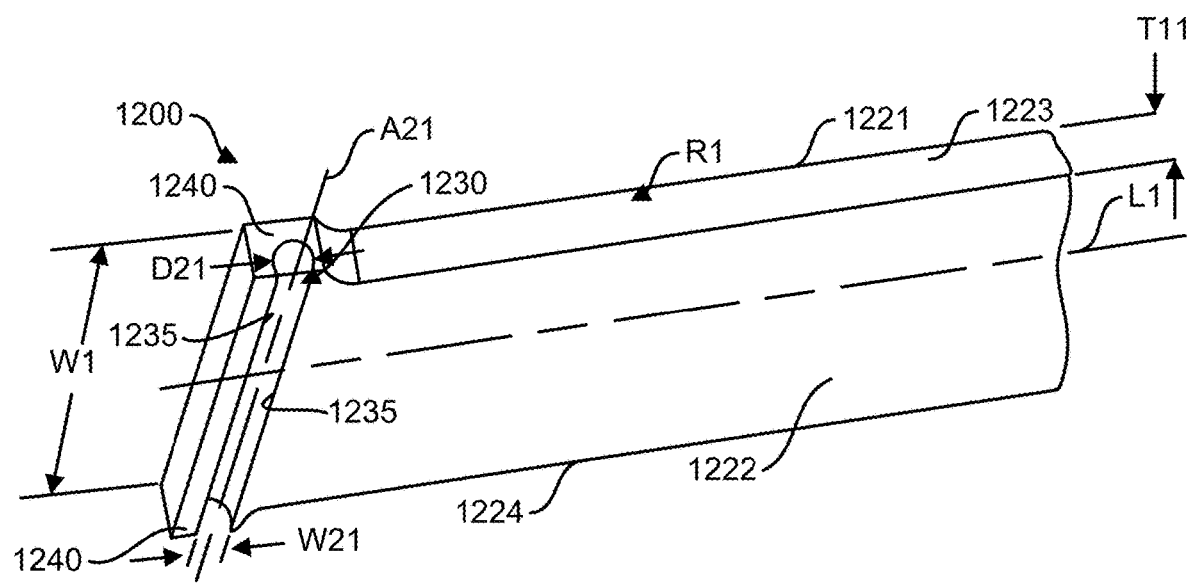
FIG. 26 is an enlarged perspective view of the seat panel of the seat of FIG. 22, according to an embodiment of the present disclosure.

FIG. 26 illustrates a bottom perspective view of a portion of one of the seat panels 1200 having a generally elongated planar configuration. Panel 1200 may be essentially the same as panel 200 (FIG. 5) described above. For example, panel 1200 includes a top surface 1221, a bottom surface 1222, longitudinally-extending peripherally extending sides 1223 and 1224 disposed therebetween, and a longitudinal axis L1. Disposed along the end portions (only one of which is shown in FIG. 26) of seat panel 1200 are channels 1230 having a bottom cutout or opening 1235, which channel 1230 and bottom opening 1235 extend along an axis A21 across the width of support panel 1200. Axis A21 is disposed perpendicular to longitudinal axis L1. The seat panels 1200 include end portions with channels 1230 (one shown in FIG. 26) being wider than the middle portion of the seat panel 1200 so that seat panels 1200 define openings 1250 (FIG. 22) between adjacent panels 1200 along the seat 1020 of article of furniture 1010. Panels 1200 may have a constant thickness T11 along its longitudinal length with channels 1230 disposed within the constant thickness of panel 1230 and across the entire width W11 of panel 1200 from longitudinally peripherally extending side 1223 to longitudinally peripherally extending side 1224.

Similarly, as shown in FIG. 22, the back panels 1500 include end portions with the channels being wider than the middle portion of the back panel 1500 so that back panels 1500 define cutouts or openings 1550 between adjacent panels 1500 along back 1050 of article of furniture 1010. In addition, in this illustrate embodiment, the elongated back panels and elongated seat panels are disposed so that the longitudinal axes of the panels extend from the left side to the right side of the article of furniture. In some embodiments, the seat panels and the back panels have the same length and width. In some embodiments, the seat and the back of the article of furniture have the same width.

With reference again to FIG. 26, in this embodiment, channel 1230 may have a generally circular cross-section. Bottom opening 1235 may have a width W21 sized smaller than the diameter D21 of the circular cross-section and extend from longitudinally peripherally extending side 1223 to longitudinally peripherally extending side 1224. A relief R1 may extend along the length of panel 1200 resulting in outwardly extending portions 1240 along the edge portions of panel 1200. With reference again to FIG. 23, the cutout in seat panels 1200 may be sized for a tight fit or press fit connection with the bulbous portion of seat connector 1400. The diameter D21 of the cutout may be about ⅜ inch. It will be appreciated that the cutout and bulbous member may have other configurations. For example, the cutout and bulbous member may have square, rectangular, or other suitable mattingly engaging configurations.

Figure 27:
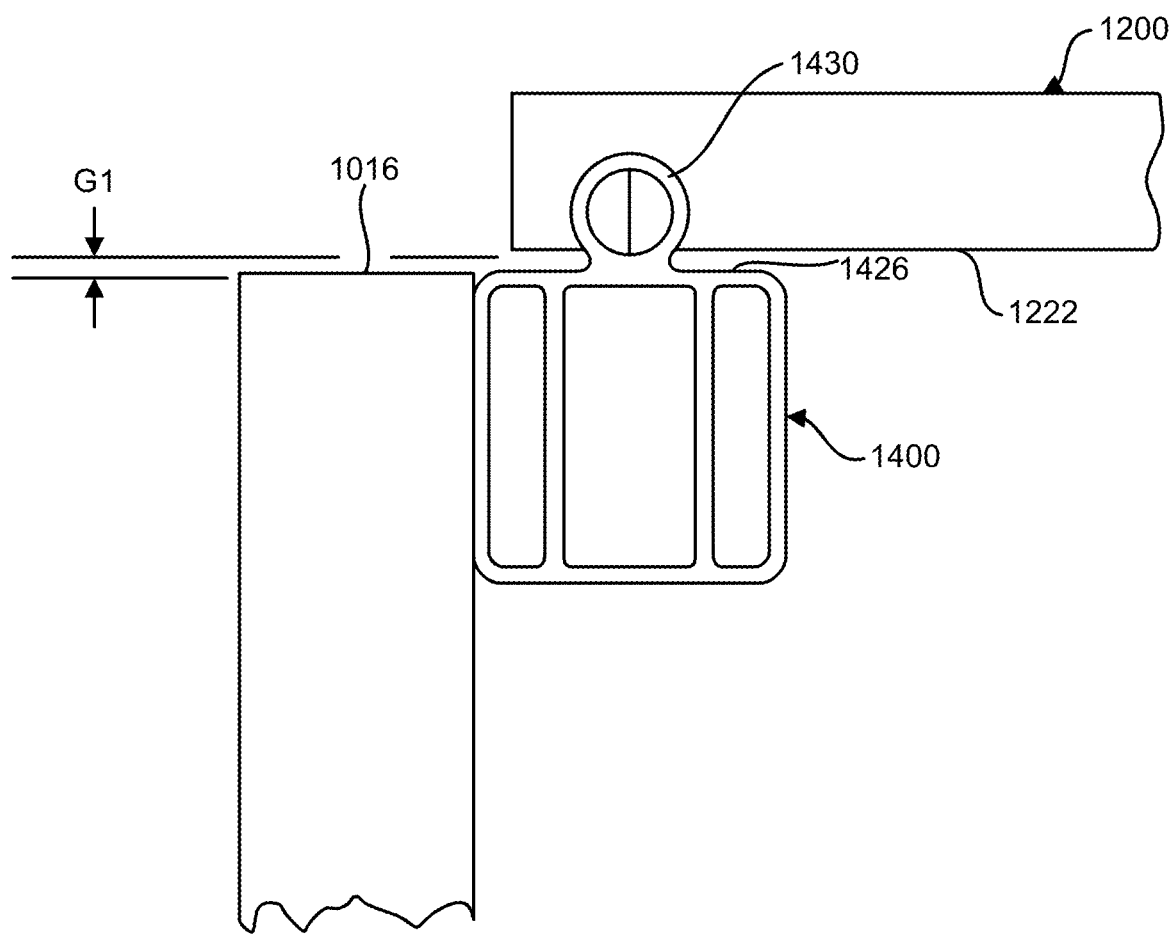
FIG. 27 is an enlarged cross-sectional view of the attachment of the seat panel to a seat connector in FIG. 22, according to an embodiment of the present disclosure

FIG. 27 illustrates a cross-sectional view of the attachment of the seat panel 1200 to the seat connector 1400. As shown, the bottom surface 1222 of the seat panel 1200 may be spaced apart from top edge 1016 of rear legs and seat supports 1015 a distance G1 of about 5/32 inch. For example, the bottom surface 1222 of the seat panel 1200 may be spaced apart from top surface 1426 of body 1420, the distance G1 of about 5/32 inch, and a bottom of bulbous member 1430 may be spaced apart from top edge 1016 of rear legs and seat supports 1015 a distance G1 of about 5/32 inch. As shown in FIG. 27, the seat panel 1200 may be a solid seat panel. The solid seat panels may be fabricated from a Marine Grade Polymer material or other suitable material.

With reference again to FIG. 23, seat connector 1400 may be formed initially as a straight extruded seat connector having an elongated body 1420 and elongated bulbous member 1430. The bulbous member 1430 may be cut and body 1420 may be bent and/or stretched so that the seat connector has a first portion and a second portion disposed at an angle. For example, the cut bulbous member 1430 may have cut end 1439, which after forming e.g., on a suitable tool, may be spaced apart from each other as shown in FIG. 23.

As shown in FIG. 28, back 1030 of the article of furniture may include a pair of back post connectors 1600 that act as back posts, a top rail 1720, and a cross-member 1740. Back posts connectors 1600 may be essentially the same as seat connectors 1400 described above. Desirably, the support member 1620 of the back post connector 1600 resists shear and bending forces, while the bulbous member 1630 also resists shear and bending forces experienced by back post connector 1600.

Figure 29:
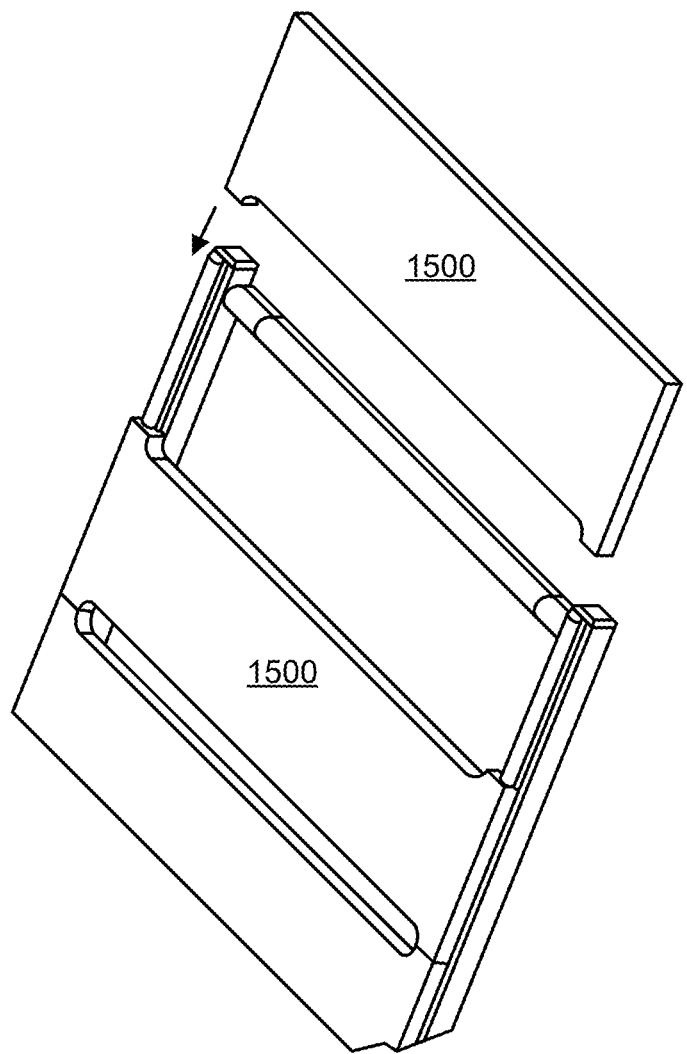
FIG. 29 is an exploded, front perspective view of the back of the seat of FIG. 22, according to an embodiment of the present disclosure.
Figure 30:
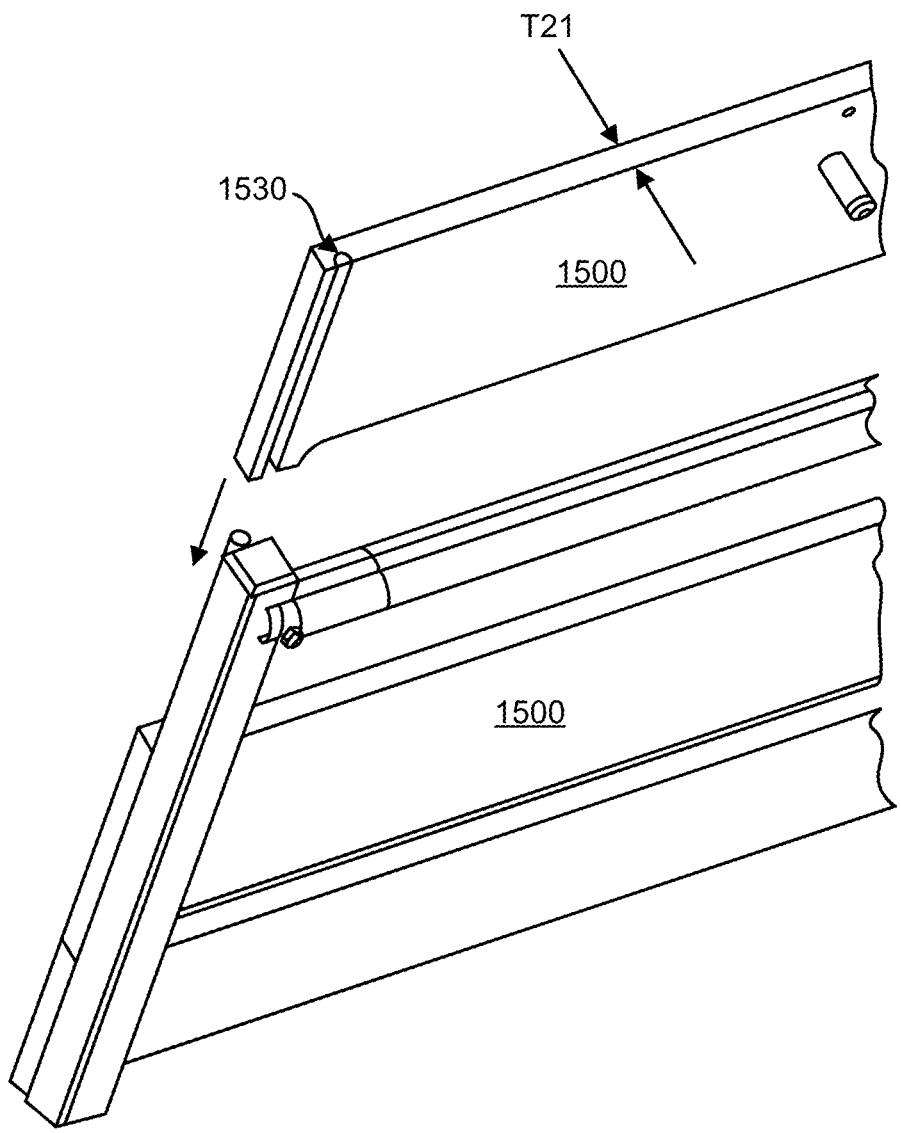
FIG. 30 is an exploded, rear perspective view of the back of the seat of FIG. 22, according to an embodiment of the present disclosure.

With reference to FIGS. 29 and 30, back panels 1500 may be essentially the same as seat panel 1200 described above. Back panel 1500 are slid onto back post connectors 1600. Panels 1500 may have a constant thickness T21 along its longitudinal length with channels 1530 disposed within the constant thickness of panel 1500.

Figure 31:
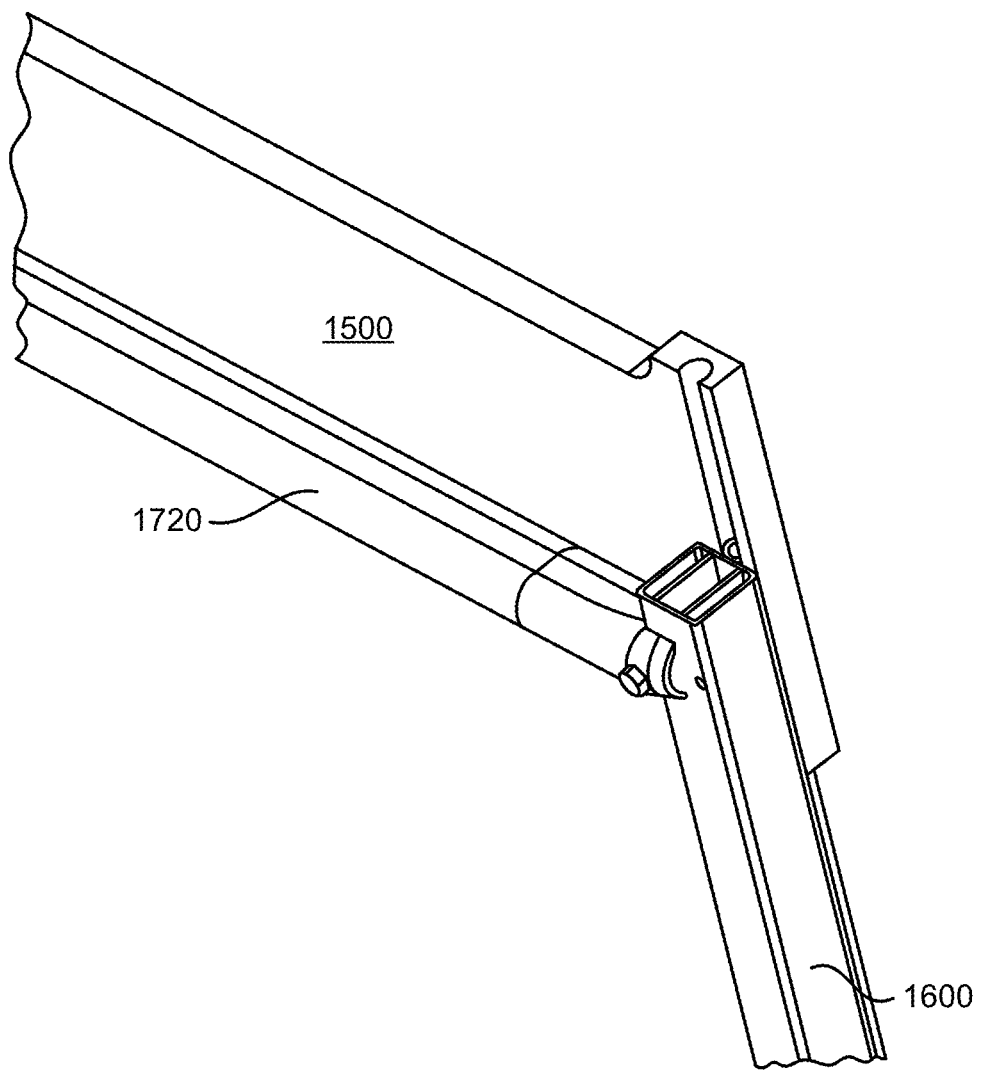
FIG. 31 is an enlarged, rear perspective view of the back of the seat of FIG. 22 with a back support partially removed/installed, according to an embodiment of the present disclosure.

FIG. 31 illustrates back panel 1500 being slid onto back post connectors 1600. The cutout in back panels 1500 may be sized to for a tight fit or press fit connection with the bulbous portion of back post connector 1600. Top rail 1720 and cross-member 1740 (FIG. 28) may have an oval cross-section. The ends may be partially cut so that end portions of the top rail 1720 and cross-member 1740 (FIG. 28) may provide portions for receiving bolts, screws, or other fasteners for connecting the top rail 1720 and cross-member 1740 (FIG. 28) to back post connector 1600.

Figure 32:
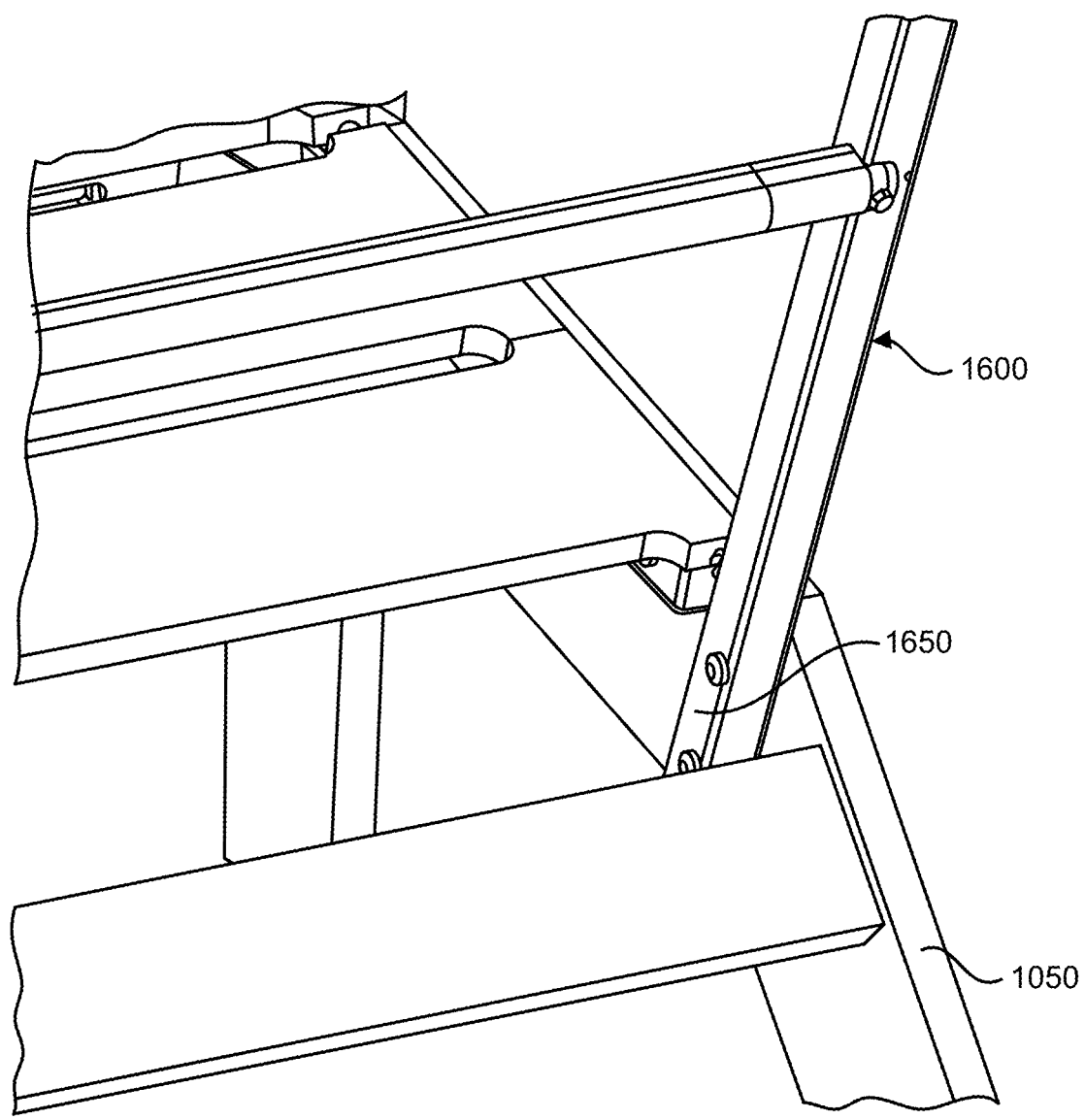
FIG. 32 is an enlarged, rear perspective view of the back of the seat of FIG. 22 with the back supports removed, according to an embodiment of the present disclosure.

FIG. 32 illustrates the attachment of the lower portion 1650 of back post 1600 to rear legs and seat supports 1015.

Figure 33:
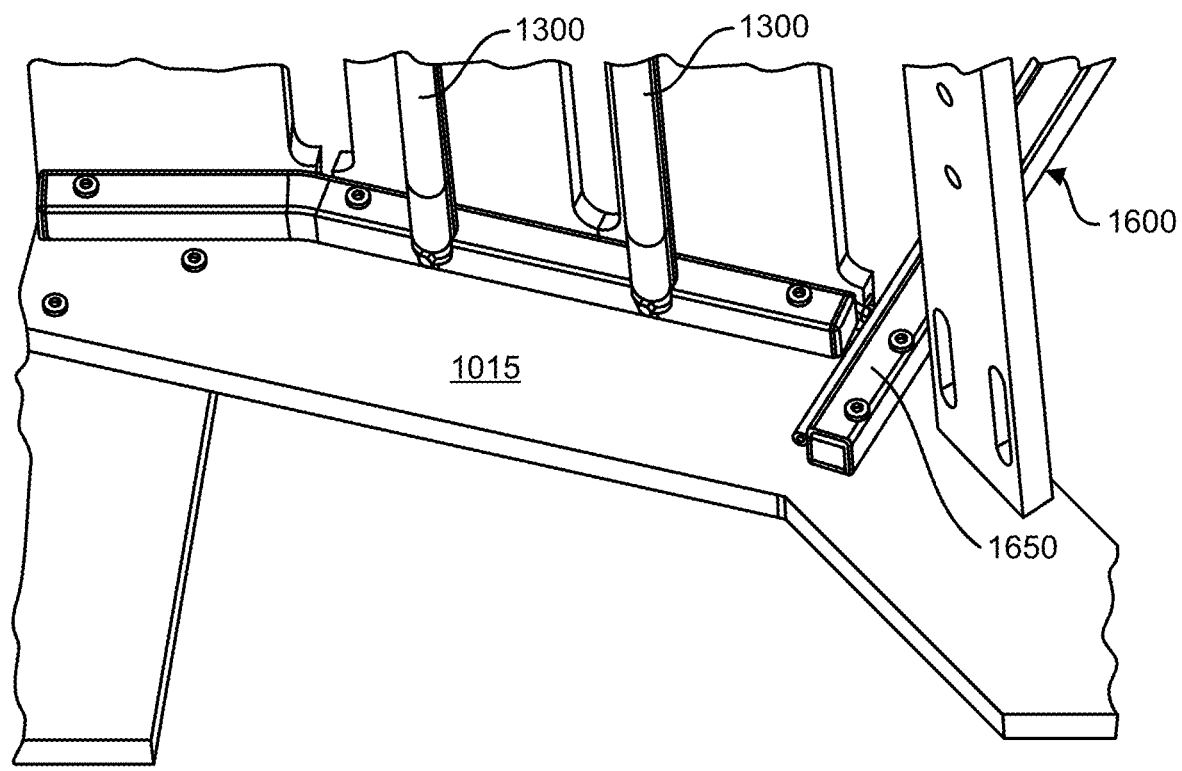
FIG. 33 is an enlarged, perspective view of the bottom of the seat of FIG. 22 with the back supports removed, according to an embodiment of the present disclosure.

As best shown in FIG. 33, a lower portion 1650 of back post connector 1600 may be operably attached to rear legs and seat supports 1015, For example, a side of body 1420 of back connectors 1600 may rests flat against the inside surface of rear legs and seat supports 1015, and suitable bolts, screws, or other fasteners may operably connect body of the back connectors 1600 to rear legs and seat supports 1015, and inhibit rotation of back connectors 1600 relative to rear legs and seat supports 1015. As shown in FIG. 22, arms 1017 may be operably attached to back post support and front legs 14 to aid in maintaining back 50 in an upright orientation. A plurality of cross-members 1300, similar to cross-member 1740 (FIG. 28), may extend between seat connectors 1400.

With reference again to FIG. 22, the inner edge of the arms may rest against a surface of body 1620 back connector 1600 an operably connected with suitable connectors.

Figure 34:
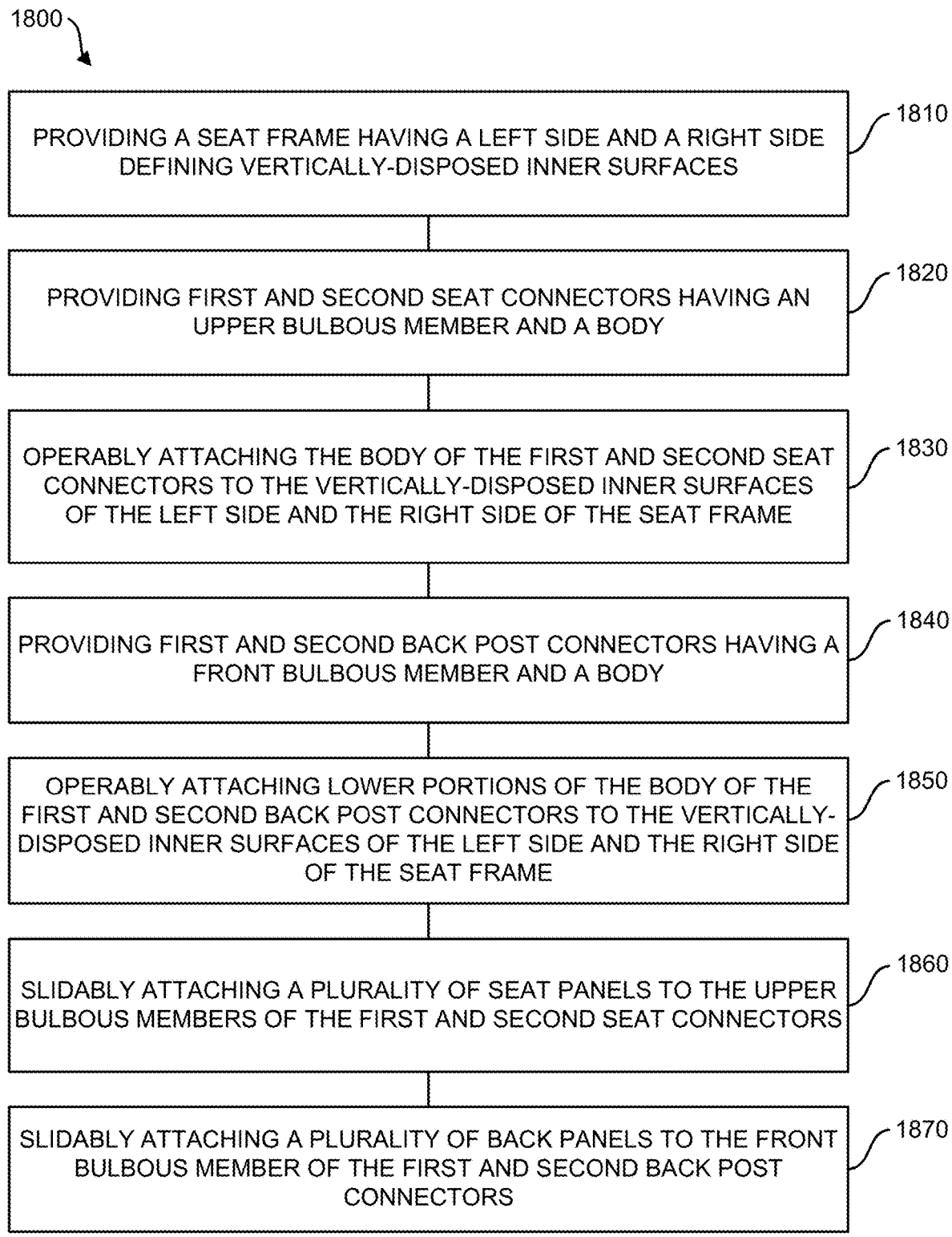
FIG. 34 is a flowchart of a method for forming an article of furniture, according to an embodiment of the present disclosure.

FIG. 34 illustrates a method 1800 for forming an article of furniture, according to an embodiment of the present disclosure. Method 1800 includes at 1810 providing a seat frame having a left side and a right side defining vertically-disposed inner surfaces, at 1820 providing first and second seat connectors having an upper bulbous member and a body, at 1830 operably attaching the body of the first and second seat connectors to the vertically-disposed inner surfaces of the left side and the right side of the seat frame, at 1840 providing first and second back post connectors having a front bulbous member and a body, at 1850 operably attaching lower portions of the body of the first and second back post connectors to the vertically-disposed inner surfaces of the left side and the right side of the seat frame, at 1860 slidably attaching a plurality of seat panels to the upper bulbous members of the first and second seat connectors, and at 1870 slidably attaching a plurality of back panels to the front bulbous member of the first and second back post connectors.

It is to be understood that the above description is intended to be illustrative, and not restrictive. For example, the above-described embodiments and/or aspects thereof may be used in combination with each other. In addition, many modifications may be made to adapt a particular situation or material to the teachings of the various embodiments without departing from their scope.

While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions, or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

This written description uses examples in the present disclosure, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An article of furniture comprising:
a seat frame;
first and second spaced apart seat connectors, each of said seat connectors comprising an upper bulbous member and a body, said body of said seat connectors operably connected to said seat frame and extending along a left side and a right side of said seat frame;
a plurality of elongated seat panels, each of said elongated seat panels comprising first and second spaced apart channels therein with cutouts extending from said channels and opening onto a bottom surface of said seat panels, said cutouts having a width less than a width of said channel, and wherein said channels of said elongated seat panels are receivable on said upper bulbous members of said spaced apart seat connectors so that said plurality of seat panels form a seat;
first and second spaced apart back post connectors, each of said back connectors comprising a front bulbous member and a body, lower portions of said back post connectors operably connected to said seat frame extending upwardly from said left side and said right side of said seat frame; and
a plurality of elongated back panels, each of said elongated back panels comprising first and second spaced apart channels therein and having a cutout extending from said channels and opening onto a rear surface of said back panels, said cutouts having a width less than a width of said channel, and wherein said channels of said elongated back panels are receivable on said front bulbous members of said spaced apart back post connectors so that said plurality of back panels form a back.

2. The article of furniture of claim 1 wherein:
said bulbous member of said first and second spaced apart seat connectors comprises a hollow bulbous member;
said body of said first and second spaced apart seat connectors comprises a hollow body;
said bulbous member of said first and second spaced apart back post connectors comprises a hollow bulbous member; and
said body of said first and second spaced apart back post connectors comprises a hollow body.

3. The article of furniture of claim 1 wherein:
a bottom surface of said seat panel is spaced apart from a top surface of said body of said first and second spaced apart seat connectors; and
a rear surface of said back panel is spaced apart from a front surface of said body of said first and second spaced apart back post connectors.

4. The article of furniture of claim 1 wherein:
said body of said first and second spaced apart seat connectors comprises a square cross-section; and
said body of said first and second spaced apart back post connectors comprises a square cross-section.

5. The article of furniture of claim 4 wherein:
said square cross-section of said body of said first and second spaced apart seat connectors comprises a hollow square cross-section having at least one rib therein; and
said square cross-section of said body of said spaced apart back post connectors comprises a hollow square cross-section having at least one rib therein.

6. The article of furniture of claim 1 wherein:
an outer cross-sectional perimeter of said body of said first and second spaced apart seat connectors is greater than an outer cross-sectional perimeter of said bulbous member of said first and second spaced apart seat connectors; and an outer cross-sectional perimeter of said body of said spaced apart back post connectors is greater than an outer cross-sectional perimeter of said bulbous member of said spaced apart back post connectors.

7. The article of furniture of claim 1 wherein:
a cross-sectional area of said body of said first and second spaced apart seat connectors is greater than a cross-sectional area of said bulbous member; and
a cross-sectional area of said body of said spaced apart back post connectors is greater than a cross-sectional area of said bulbous member of said spaced apart back post connectors.

8. The article of furniture of claim 1 wherein:
said left side and said right side of said seat frame comprises vertically-disposed inner surfaces.

9. The article of furniture of claim 1 wherein:
said channels of said plurality of seat panels are slidably receivable on said upper bulbous members of said spaced apart seat connectors; and
said channels of said plurality of back panels are slidably receivable on said front bulbous members of said spaced apart back post connectors.

10. The article of furniture of claim 1 wherein said plurality of seat panels comprise a constant thickness with said channels disposed within the constant thickness of said seat panels, and said plurality of back panels comprise a constant thickness with said channels disposed within said constant thickness of said back panels.

11. The article of furniture of claim 1 wherein said plurality of seat panels comprise said channels and said cutouts extending across the entire width of said seat panel from one longitudinally peripherally extending side to the other longitudinally peripherally extending side, and said plurality of back panels comprise said channels and said cutouts extending across the entire width of said back panels from one longitudinally peripherally extending side to the other longitudinally peripherally extending side.

12. The article of furniture of claim 1 wherein an upper portion of said body of said seat connector is disposed even with or above a top surface of said seat frame.

13. The article of furniture of claim 1 wherein a bottom surface said seat panel is spaced apart from a top edge of said seat frame.

14. The article of furniture of claim 1 wherein said seat panels and said back panels comprise end portions with said channels being wider than said middle portions of said panels so that said panels define openings between adjacent panels along said seat and said back of said article of furniture.

15. The article of furniture of claim 1 wherein said elongated back panels and said elongated seat panels comprise longitudinal axes, and said elongated back panels and said elongated seat panels are disposed so that said longitudinal axes of said panels extend from the left side to the right side of the article of furniture.

16. The article of furniture of claim 1 wherein said channels of said seat panels and said upper bulbous member of said seat connectors are operably sized for a press-fit connection, and said channels of said back panels and said front bulbous member of said back connectors are operably sized for a press-fit connection.

17. The article of furniture of claim 1 wherein said seat panels and said back panels comprise solid one-piece panels.

18. An article of furniture comprising:
a seat frame comprising a left side and a right side defining vertically-disposed inner surfaces;
first and second spaced apart seat connectors, each of said seat connectors comprising an upper hollow bulbous member supported by a hollow body, said hollow body of said seat connectors operably connected to said seat frame and extending along said left side and said right side of said seat frame;
a plurality of elongated seat panels, each of said elongated seat panels comprising first and second spaced apart channels therein with cutouts extending from said channels and opening onto a bottom surface of said seat panels, said cutouts having a width less than a width of said channel, and wherein said channels of said elongated seat panels are slidably receivable on said upper bulbous members of said spaced apart seat connectors so that said plurality of seat panels form a seat with a bottom surface of said seat panel spaced apart from a top surface of said body of said first and second spaced apart seat connectors;
first and second spaced apart back post connectors, each of said back connectors comprising a front hollow bulbous member supported by a hollow body, lower portions of said back post connectors operably connected to said seat frame extending upwardly from said left side and said right side of said seat frame; and
a plurality of elongated back panels, each of said elongated back panels comprising first and second spaced apart channels therein and having a cutout extending from said channels and opening onto a rear surface of said back panels, said cutouts having a width less than a width of said channel, and wherein said channels of said elongated back panels are slidably receivable on said front bulbous members of said spaced apart back post connectors so that said plurality of back panels form a back with a rear surface of said back panel spaced apart from a front surface of said body of said first and second spaced apart back post connectors.

19. The article of furniture of claim 18 wherein:
said body of said first and second spaced apart seat connectors comprises a square cross-section; and
said body of said first and second spaced apart back post connectors comprises a square cross-section.

20. The article of furniture of claim 19 wherein:
said square cross-section of said body of said first and second spaced apart seat connectors comprises a hollow square cross-section having at least one rib therein; and
said square cross-section of said body of said spaced apart back post connectors comprises a hollow square cross-section having at least one rib therein.

21. A method for forming an article of furniture, the method comprising:
providing a seat frame having a left side and a right side defining vertically-disposed inner surfaces;
providing first and second seat connectors having an upper bulbous member and a body;
operably attaching the body of the first and second seat connectors to the vertically-disposed inner surfaces of the left side and the right side of the seat frame;
providing first and second back post connectors having a front bulbous member and a body;
operably attaching lower portions of the body of the first and second back post connectors to the vertically-disposed inner surfaces of the left side and the right side of the seat frame;
slidably attaching a plurality of seat panels to the upper bulbous members of the first and second seat connectors; and slidably attaching a plurality of back panels to the front bulbous member of the first and second back post connectors.

22. The method of claim 21 wherein the slidably attaching a plurality of seat panels to the upper bulbous members of the first and second seat connectors comprises supporting a bottom surface of the seat panel spaced apart from a top surface of the body of the first and second spaced apart seat connectors.

23. The method of claim 21 wherein the slidably attaching a plurality of back panels to the front bulbous members of the first and second back post connectors comprises supporting a rear surface of the back panel spaced apart from a front surface of the body of the first and second spaced apart back post connectors.

* * * * *